(12) United States Patent
Evangelista et al.

(10) Patent No.: US 11,995,776 B2
(45) Date of Patent: May 28, 2024

(54) EXTENDED REALITY INTERACTION IN SYNCHRONOUS VIRTUAL SPACES USING HETEROGENEOUS DEVICES

(71) Applicant: SAMSUNG ELECTRONICS CO., LTD., Gyeonggi-Do (KR)

(72) Inventors: Edgar Charles Evangelista, San Jose, CA (US); Aaron Faucher, San Mateo, CA (US); Jaehyun Kim, San Francisco, CA (US); Andrew R McHugh, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/359,300

(22) Filed: Jun. 25, 2021

(65) Prior Publication Data
US 2022/0230399 A1 Jul. 21, 2022

Related U.S. Application Data

(60) Provisional application No. 63/139,175, filed on Jan. 19, 2021.

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/017* (2013.01); *G06T 15/20* (2013.01); *G06T 17/20* (2013.01); *G06V 20/49* (2022.01)

(58) Field of Classification Search
CPC ....... G06T 19/006; G06T 15/20; G06T 17/20; G06F 3/017; G06K 9/00765; G06V 20/49
See application file for complete search history.

(56) References Cited

U.S. PATENT DOCUMENTS

| 8,300,077 B2 | 10/2012 | Dunko |
| 8,866,849 B1 | 10/2014 | Cho et al. |

(Continued)

FOREIGN PATENT DOCUMENTS

| CN | 105721821 A | 6/2016 |
| CN | 107483872 A | 12/2017 |

(Continued)

OTHER PUBLICATIONS

Lee, Jangwoo et al., "Panoramic Mesh Model Generation for Indoor Environment Modeling", https://www.researchgate.net/publication/228969031_Panoramic_Mesh_Model_Generation_for_Indoor_Environment_Modeling (Year: 2004).*

(Continued)

*Primary Examiner* — Chante E Harrison
(74) *Attorney, Agent, or Firm* — Cuenot, Forsythe & Kim, LLC

(57) ABSTRACT

Extended reality interactions include capturing, with a first device, video of a first user and conveying same to a second, heterogeneous device. A 3D mesh is received by the first device from the second device for rendering an extended reality environment, which is simultaneously displayed on the second device. Video of a second user and pose transforms for compositing the video of the second user in the extended reality environment displayed on the first device is received. A view perspective of the video of the second user composited in the extended reality environment is based on the pose transforms. Input to the first device changes the view perspective. View perspective data is conveyed from the first device to the second device that causes a corresponding change in view perspective of the video of the first user composited in the extended reality environment simultaneously displayed on the second device.

18 Claims, 15 Drawing Sheets

(51) Int. Cl.
    *G06T 15/20*    (2011.01)
    *G06T 17/20*    (2006.01)
    *G06V 20/40*    (2022.01)

(56) References Cited

U.S. PATENT DOCUMENTS

| | | | |
|---|---|---|---|
| 9,325,936 | B2 | 4/2016 | Cullen et al. |
| 10,353,535 | B2 | 7/2019 | Ng et al. |
| 10,692,390 | B2 | 6/2020 | Ha et al. |
| 11,064,256 | B1* | 7/2021 | Voss .................. H04N 7/147 |
| 11,233,974 | B1* | 1/2022 | Adcock ............... H04N 7/157 |
| 2014/0184724 | A1 | 7/2014 | Cho |
| 2015/0244984 | A1* | 8/2015 | Zhang ................. H04N 7/147 |
| | | | 348/14.07 |
| 2016/0353056 | A1 | 12/2016 | Cullen |
| 2016/0353058 | A1 | 12/2016 | Caviedes et al. |
| 2017/0038829 | A1* | 2/2017 | Lanier ................ G06F 3/011 |
| 2017/0061700 | A1 | 3/2017 | Urbach et al. |
| 2018/0095636 | A1 | 4/2018 | Valdivia et al. |
| 2018/0307310 | A1 | 10/2018 | Mccombe et al. |
| 2019/0222806 | A1 | 7/2019 | Soppelsa et al. |
| 2019/0289198 | A1* | 9/2019 | Bosworth .......... H04N 5/23219 |
| 2019/0313059 | A1* | 10/2019 | Agarawala .......... H04L 65/403 |
| 2019/0379863 | A1 | 12/2019 | Rivard et al. |
| 2020/0074643 | A1 | 3/2020 | Yamasaki et al. |
| 2020/0184217 | A1* | 6/2020 | Faulkner ............. G06T 7/50 |
| 2020/0202634 | A1* | 6/2020 | Faulkner ............. G06F 21/604 |
| 2020/0402317 | A1 | 12/2020 | Valli et al. |
| 2021/0056747 | A1 | 2/2021 | Hefny et al. |
| 2021/0065450 | A1* | 3/2021 | Shin .................. G02B 5/124 |
| 2022/0229535 | A1* | 7/2022 | Evangelista ......... H04N 7/147 |

FOREIGN PATENT DOCUMENTS

| | | | | |
|---|---|---|---|---|
| CN | 108337466 A | | 7/2018 | |
| CN | 109803109 A | | 5/2019 | |
| KR | 102246335 B1 | | 4/2021 | |
| WO | 2017166360 A1 | | 10/2017 | |
| WO | 2020125493 A1 | | 12/2018 | |
| WO | 2019025997 A1 | | 2/2019 | |
| WO | WO-2021062278 A1 | * | 4/2021 | ............. G06F 3/011 |
| WO | WO-2021168338 A1 | * | 8/2021 | ........... G06T 15/005 |
| WO | WO-2022147736 A1 | * | 7/2022 | |

OTHER PUBLICATIONS

"ARcall feel the presence," [online] ARcall [retrieved Jun. 25, 2021], retrieved from the Internet: <http://www.arcall.com/>, 1 pg.
"Spatial," [online], Spatial Dev, Jun. 22, 2021, retrieved from the Internet: <https://play.google.com/store/apps/details?id=io.spatial.spatial&hl=en_US&gl=US>, 3 pg.
WIPO App. PCT/KR2022/095008, International Search Report and Written Opinion, dated Apr. 14, 2022, 9 pg.

* cited by examiner

EXTENDED REALITY INTERACTION IN SYNCHRONOUS VIRTUAL SPACES USING HETEROGENEOUS DEVICES

CROSS-REFERENCE TO RELATED APPLICATIONS

This application claims the benefit of U.S. Provisional Patent Application No. 63/139,175 filed on Jan. 19, 2021, which is incorporated herein by reference in its entirety.

TECHNICAL FIELD

This disclosure relates to technologies for engaging in human-human and human-machine interactions, and more particularly, to human-human interactions within machine-facilitated extended reality environments.

BACKGROUND

Extended reality (XR)—broadly encompassing virtual reality (VR), augmented reality (AR), mixed reality (MR), and the like—refers to environments and interactions generated using computer technologies implemented in wearables and other devices. An expanding area of technology, XR is being utilized in various fields such as entertainment, marketing, interactive training, telework, and other endeavors. An example application of XR technology is the facilitation of three-dimensional (3D) video calls, sometimes referred to as "holocalls." Using, for example, AR glasses, a head-mounted display (HMD), or other wearable paired with a depth camera, two or more users remotely located from one another can interact as though co-located physically in one place such as an office, living room, or other environment.

SUMMARY

In an example implementation, a computer-based method for facilitating holocalls using heterogenous devices includes capturing, with a first device, video of a first user and conveying the video to a second device, wherein the first and second devices are heterogeneous devices. The method includes displaying, on the first device, a 3D mesh rendering of an extended reality environment based on a 3D mesh received from the second device for enabling the first device to render the extended reality environment, which is simultaneously displayed on the second device. The method includes receiving, with the first device, video of a second user and pose transforms for compositing the video of the second user in the extended reality environment displayed on the first device, wherein a view perspective of the video of the second user composited in the extended reality environment is based on the pose transforms. The method includes changing the view perspective of the video of the second user composited in the extended reality environment in response to input to the first device. The method includes conveying view perspective data from the first device to the second device for causing a corresponding change in view perspective of the video of the first user composited in the extended reality environment simultaneously displayed on the second device.

In another example implementation, a system for facilitating holocalls using heterogenous devices includes a processor configured to initiate operations. The operations include capturing, with a first device, video of a first user and conveying the video to a second device, wherein the first and second devices are heterogeneous devices. The operations include displaying, on the first device, a 3D mesh rendering of an extended reality environment based on a 3D mesh received from the second device for enabling the first device to render the extended reality environment, which is simultaneously displayed on the second device. The operations include receiving, with the first device, video of a second user and pose transforms for compositing the video of the second user in the extended reality environment displayed on the first device, wherein a view perspective of the video of the second user composited in the extended reality environment is based on the pose transforms. The operations include changing the view perspective of the video of the second user composited in the extended reality environment in response to input to the first device. The operations include conveying view perspective data from the first device to the second device for causing a corresponding change in view perspective of the video of the first user composited in the extended reality environment simultaneously displayed on the second device.

In another example implementation, a computer program product includes one or more computer readable storage media, and program instructions collectively stored on the one or more computer readable storage media. The program instructions are executable by computer hardware to initiate operations. The operations capturing, with a first device, video of a first user and conveying the video to a second device, wherein the first and second devices are heterogeneous devices. The operations include displaying, on the first device, a 3D mesh rendering of an extended reality environment based on a 3D mesh received from the second device for enabling the first device to render the extended reality environment, which is simultaneously displayed on the second device. The operations include receiving, with the first device, video of a second user and pose transforms for compositing the video of the second user in the extended reality environment displayed on the first device, wherein a view perspective of the video of the second user composited in the extended reality environment is based on the pose transforms. The operations include changing the view perspective of the video of the second user composited in the extended reality environment in response to input to the first device. The operations include conveying view perspective data from the first device to the second device for causing a corresponding change in view perspective of the video of the first user composited in the extended reality environment simultaneously displayed on the second device.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1A:
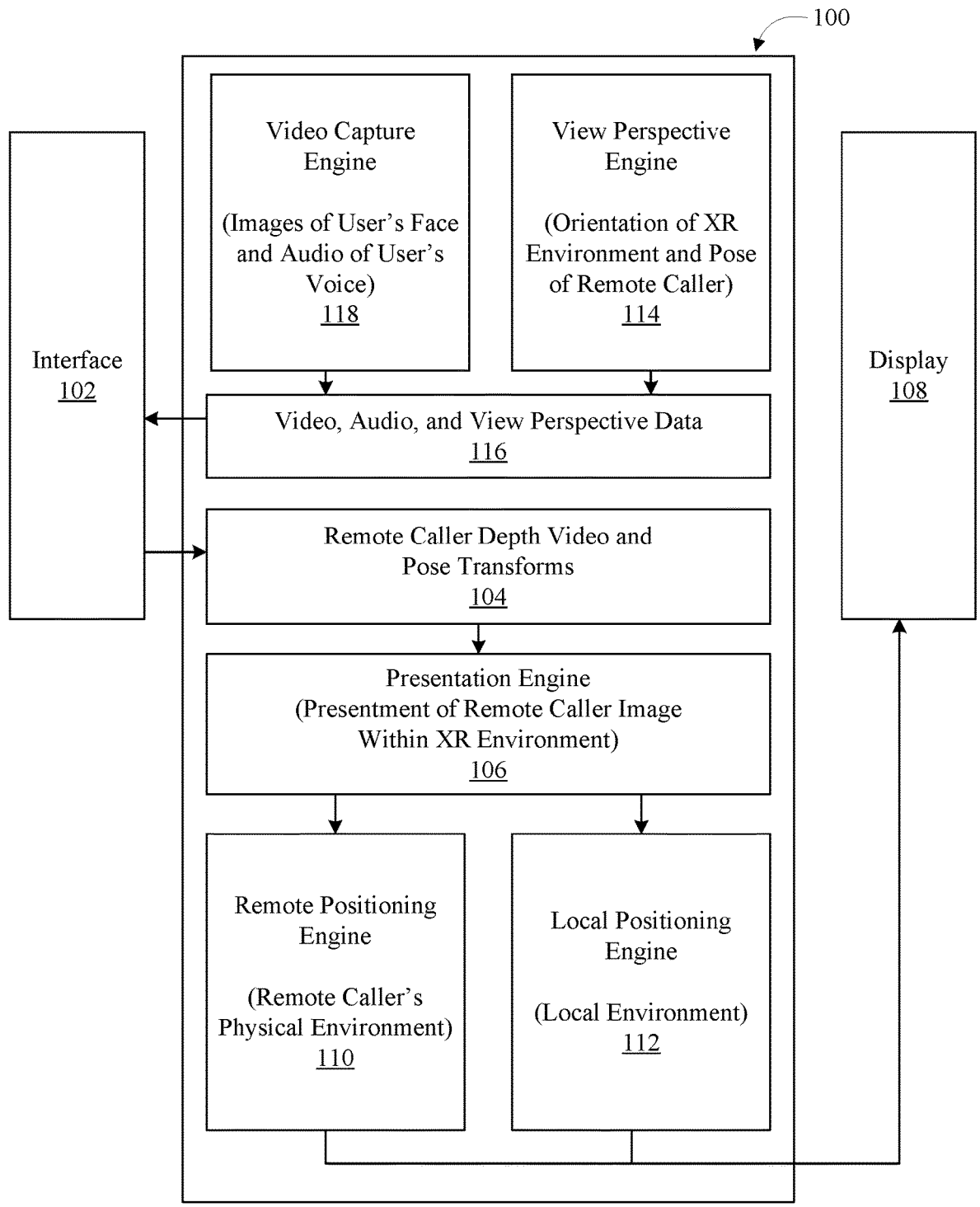
FIGS. 1A and 1B illustrate a system implemented in a first device for facilitating holocalls with at least a second, heterogenous device.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to technologies for engaging in human-human and human-machine interactions, and more particularly, to human-human interactions within machine-facilitated extended reality environments. An application of these technologies, as described above, uses AR glasses, head-mounted displays (HMDs), or other wearables paired with depth cameras to facilitate so-called holocalls for enabling users remotely located from one another to interact as though co-located physically in the same environment.

Devices lacking XR capabilities, however, limit a user's ability to participate in a holocall or interact with a user of a device having XR capabilities. The interaction is limited in as much as the user of a device that lacks XR capabilities cannot rely on the pose (position, orientation) matching that is necessary to facilitate the holocall experience. A heterogeneous device lacking XR capability cannot render changes in the user's pose when navigating through the XR environment. The lack thus adversely affects the ability of the user to engage in face-to-face interaction in a machine-generated environment with a user of an XR-capable device. Accordingly, users of heterogenous devices typically cannot or are severely restricted in their ability to engage in a holocall. As defined herein, "heterogenous devices" are a set of two or more devices participating in a holocall wherein one or more of the devices of the set has XR capability and one or more of the other devices of the set does not have XR capability.

As defined herein, "XR capabilities" are the components (e.g., software, hardware) of a device that enable the device to execute operations for rendering a virtual, augmented, and/or mixed reality environment and facilitating human-machine interaction within the environment(s).

XR capabilities of an XR-capable device, for example, can include displaying a 3D scene such that the scene is perceived stereoscopically by a user. An XR-capable device's XR capabilities can include, for example, tracking the 3D scene in space such that the 3D scene is perceived as remaining fixed in place relative to the user's space as the user moves therein. XR capabilities of an XR-capable device can include, for example, manipulating objects in the 3D scene in response to gestures (e.g., hand gestures) of the user. An XR-capable device may have all or some of these capabilities. Other XR-capable devices may have different capabilities depending on the primary purpose(s) for which the device is used as well as the specific software and/or hardware with which the device is endowed. As described in detail below, an XR-capable device can generate a 3D mesh of an XR environment. The 3D mesh may be generated from one or more images captured by the XR-capable device itself, from images captured by one or more other devices coupled thereto, or any combination thereof. In certain arrangements, an XR-capable device is configured to generate 3D stereoscopic images by presenting two offset images separately and concurrently to the left and right eye of a user such that the separately presented 2D images are perceived by user as an image having 3D depth.

An example of an XR-capable device is 3D AR glasses that include binocular lens, accelerometer, gyroscope, and mounted camera that allows the user to interact with the device with gestures. The AR glasses can include dual projectors (e.g., frame rate 120 Hz), a retro-reflective screen providing a 3D image, and a camera for position detection for causing virtual image changes in response to movements of a user. An example of an XR-capable device is a VR HMD having a stereoscopic display for providing separate offset images separately to the left and right eye of a user and a set of head-motion tracking sensors (e.g., gyroscope, accelerometer, magnetometer). The HMD can include eye tracking sensors.

In accordance with the inventive arrangements described herein, the example methods, systems, and computer program products disclosed facilitate a full holocall experience for users using heterogeneous devices. An aspect of the arrangements disclosed herein is the enabling of a user using a device that lacks XR capability (e.g., smartphone) to change the user's viewpoint of objects within an XR environment, the XR environment displayed on the non-XR-capable device based on a 3D mesh received from an XR-capable device. The viewpoint changes in sync with gestural movements of the user that are detected by the non-XR-capable device.

Moreover, the change in the user's viewpoint invokes a corresponding movement of an image of the user within the XR environment as seen by one or more users of XR-capable device(s). The corresponding movement of the user image within the XR environment matches the user's change in viewpoint. The net effect is that the user of the device lacking XR capability appears to user(s) of XR-capable device(s) as though the non-XR-capable device had XR capability. As further disclosed herein, a system for performing these actions based on gestural synchronization can run in the background of one or more heterogeneous devices such that multiple users can participate in the holocall notwithstanding that one or more of the heterogeneous devices lacks XR capabilities.

In one or more example implementations, a system implemented in a non-XR device (first device) receives from an XR-capable device (second device) a 3D mesh, which is thus used by the first device for rendering an XR environment on a display of the first device. As defined herein, "3D mesh" is a representation of a three-dimensional geometric structure comprising interconnected triangles. A 3D mesh can model multi-view range data, such as data representing the triangulation of a 3D point cloud—that is, a data collection of points within a three-dimensional coordinate system.

Accordingly, in the present context, a 3D mesh can be used to generate a mesh model, or image, of an XR environment. For example, in some instances a device user can scan a local environment (e.g., an indoor environment of the device user). Alternatively, the device user can create a different XR environment, including an MR environment or wholly virtual AR environment. The mesh model, or image, is created by dividing a point cloud into several non-overlapping areas, projecting each area to a virtual camera, and triangulating the point cloud onto a virtual 2D image plane. Each such 2D image plane is back-projected to a 3D space, and a panoramic mesh model of the environment is generated by merging adjacent mesh models. Thus, in one or more example implementations, the system implemented in the first device uses the 3D mesh received from the second device to render an XR environment on a first device display (e.g., smartphone screen).

The system implemented in the first device, in accordance with inventive arrangements disclosed herein, also can create an image of a remote caller (second device user) within the XR environment rendered on the first device by compositing a video of the remote caller with the rendering of the XR environment. In some arrangements, a single-perspective depth video that projects a plane into the shape of the depth channel is used. In various other arrangements, multi-perspective depth video (captured from more than one video camera or sensor) is used. Multi-perspective depth video uses a separate 3D mesh and separate texture for each frame, and a single mesh can be generated for the remote caller image, which is then deformed based on the caller's pose in the video.

The system enables the user of the first device (e.g., smartphone) to move their viewpoint using certain gestures while simultaneously allowing the user of the second device (e.g., AR glasses) to see the user of the first device moving in sync with the first device user's gestures so that the first device user appears as though also using an XR-capable device (e.g., AR glasses). In some arrangements, user gestures include 2D single- or multi-finger gestures input to the first device via a touchscreen of the first device. In other arrangements, the user gestures include 3D hand gestures captured by a camera embedded in (e.g., smartphone camera) or operatively coupled with the first device. In still other arrangements, user gestures include 3D facial movements captured by a camera embedded in or operatively coupled with the first device. In yet other arrangements, user gestures include a 3D tracked pose, which is captured by a camera of the first device, and which is in sync with the viewpoint of the first device user.

As defined herein, "compositing" is a system-executed process of combining visual elements from separate sources into single images thereby creating the illusion that the visual elements are present within and part of the same XR environment. The view perspective of images composited within the XR environment is determined by pose transforms which are received by the first device from the second device, the second device used by the remote caller. As defined herein, "view perspective" is the angle, orientation, and depth of an object composited in the XR environment rendered on a device screen or other display as seen by a user of the device. The video of the remote caller and corresponding pose transforms can be acquired by the first device from the second, XR-capable device. As defined herein, "pose" is data indicating the location and orientation of one frame with respect to another frame, and "pose transform" is data for mapping a point from the one frame to that point's location in the other frame.

An aspect of the inventive arrangements disclosed is that the same XR environment may be rendered by a display of the first device and a separate display of the second device. Moreover, the view perspective of the first user viewing the XR environment and composited image of the second user therein on the first device may be mirrored by the view perspective of the second user viewing the XR environment and composited image of the first user therein on the second device.

Relatedly, another aspect is that a change in one user's view perspective using one device automatically invokes a corresponding, mirrored change in the other user's view perspective using the other device. The mutual effect is based on tracking changes in view perspectives using a shared anchor and common coordinate system for mapping the respective pose transforms captured by each of the respective devices. As defined herein, "coordinate system" is a system for locating points in space, and "shared anchor" is a reference point shared by the first and second devices for performing mappings that render changes in view perspective. Changes in view perspective based on separate movements of the first and second users can be tracked by their respective devices and mapped using the common coordinate system to effect movements within the XR environment. The shared anchor precludes conflicting movements and coordinates the respective views seen by the first and second users. In various arrangements, view perspectives can be changed by device-tracked movements of the first and/or second user, as well as other events such as extraneous media sharing. The system thus gives the first and second users, using respectively the separate first and second heterogeneous devices, the experience of engaging in a face-to-face interaction within the same XR environment rendered simultaneously on both devices.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1A illustrates an example system for simulating physical copresence (system) 100 using heterogenous devices. System 100 can be implemented as processor-executable software and/or dedicated hardwire circuitry in an electronic device. The electronic device, for example, can be a smartphone, smartwatch, PC, tablet, or other such device that, though capable of capturing, transmitting, receiving, and processing video (including audio), nevertheless lacks XR capabilities. As a first device, however, the electronic device in which system 100 is implemented can communicatively couple with a second device that is XR-capable. In the present context, the electronic device (first device) lacking XR capabilities, and the other electronic device (second device) endowed with XR capabilities, are heterogeneous devices. As defined herein, "XR capabilities"

are the components (e.g., software, hardware) of a device that enable the device to execute operations for rendering a virtual, augmented, and/or mixed reality environment and facilitating human-machine interaction within the environment(s). System 100, implemented in the first device, enables a user (first user) of the first device to engage in a holocall with a remote caller (second user) using the second device, notwithstanding the first device's lack of XR capabilities.

System 100 communicatively couples through interface 102 to a communication unit (not shown) of the first device, which receives (via wired or wireless transmissions) from the second device a 3D mesh that is used by the first device for rendering an XR environment (e.g., AR, VR, or MR environment) for viewing with the first device. The XR environment may be shared with each device one time as one or more 3D files at the beginning of a holocall. A user joining in a holocall can, for example, use a capture device (e.g., video camera) to capture the user's local environment which may appear with streaming depth video composited therein.

The XR environment that can be shared among heterogeneous devices can be based on a 3D scan of an environment, or alternatively, the XR environment can be an entirely virtual construction. In still other arrangements, the XR environment can be rendered as a mix of real and virtual environments (e.g., an MR environment).

Via interface 102, system 100 receives from the second device depth video and pose transforms 104 of an object, which can comprise images of a remote caller. The images can be enhanced by reprojecting image pixels via a shader and reducing image smearing by culling imaging triangles that are outside an expected range.

Figure 4A:
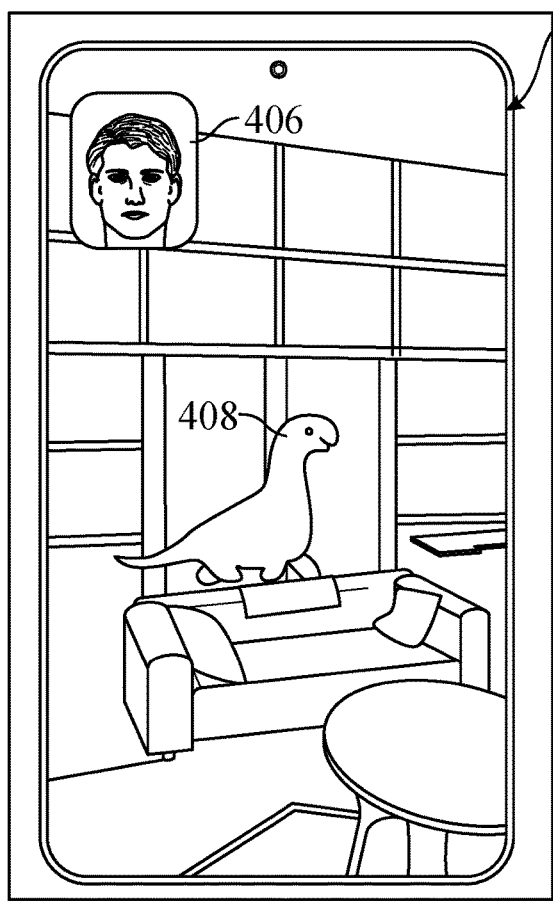
FIGS. 4A and 4B illustrate certain operative aspects of the example system of FIG. 1.
Figure 4B:
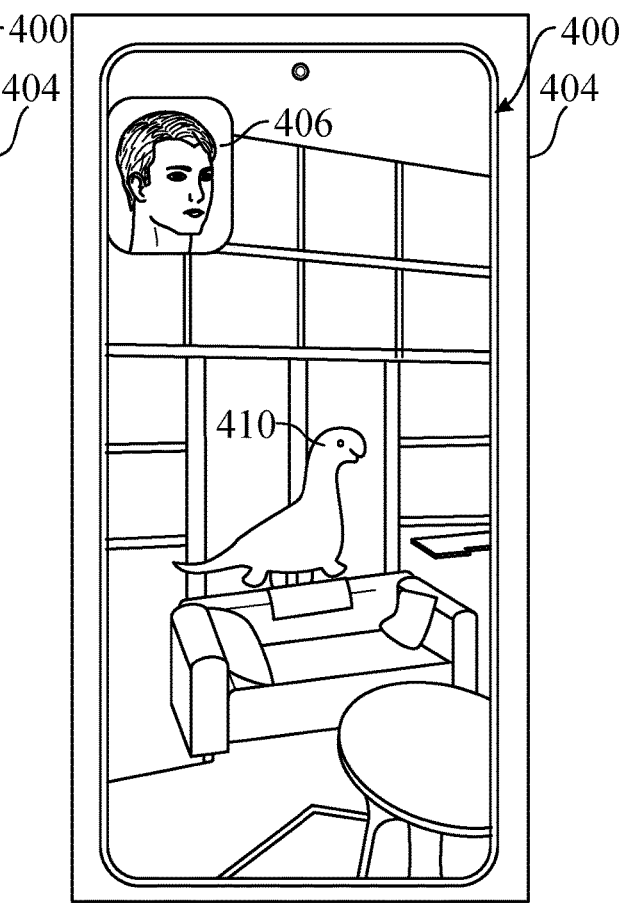

Presentation engine 106 composites the object within the depth video, which is rendered on display 108 of the first device. Remote positioning engine 110 determines the pose of the object (e.g., video images of remote caller) composited in the depth video based on the received pose transforms. The operations render an XR environment viewable on display 108 in which the image of the remote caller can be composited to facilitate a holocall between the first device user and remote caller. Optionally, local positioning engine 112 can interpose a facial image of the first device user into the view of the remote caller within the XR environment (FIGS. 4A, 4B). The facial image can be captured by a camera (not shown) that is integrated in or operatively coupled with the first device.

The view shown on display 108 is controllable by view perspective engine 114 which, based on inputs generated in response to certain predefined inputs, determines the orientation of the view of the XR environment and the pose of remote caller composited therein. The predefined inputs include user-initiated actions, such as touch-and-drag movements over a screen of the first device or movements detected by an inertial measurement unit (IMU) of the first device and then mapped to a common coordinate system and anchor reference shared by the heterogeneous devices. Other predefined inputs include system events, such as a positioning the view orientation at the start of a holocall or repositioning the view orientation in response to a sharing of media between the first and second devices.

Changing the view perspective additionally invokes a corresponding change in orientation of the view as seen by the remote caller viewing the XR rendering on the second device. The view seen by the remote caller is of the same XR environment but with images of the first user composited therein. The remote caller's view is generated based on video, audio, and view perspective data 116, which is conveyed via interface 102 to the second device. The video can include facial images as well as voice audio of the first user as captured by video capture engine 118. In general, the video can include anything captured by the camera, such as a user's face, some or all of the user's body, and background.

The view perspective data (e.g., pose transforms) determines the pose of the virtual image of the first user composited into the XR environment seen on a display of the second device. Pose transforms of the first device user and of the remote caller are mapped using a common coordinate system for determining respective poses on the separate devices. The pose transforms are relative to a shared anchor and so avoid conflicts in movements of the first user and of the remote caller within the common XR environment. A change in pose or view orientation invoked by a first user of one device is mirrored by a commensurate change in pose or view orientation as seen by a second user of the other device, albeit from the perspective of the second user.

Figure 1B:
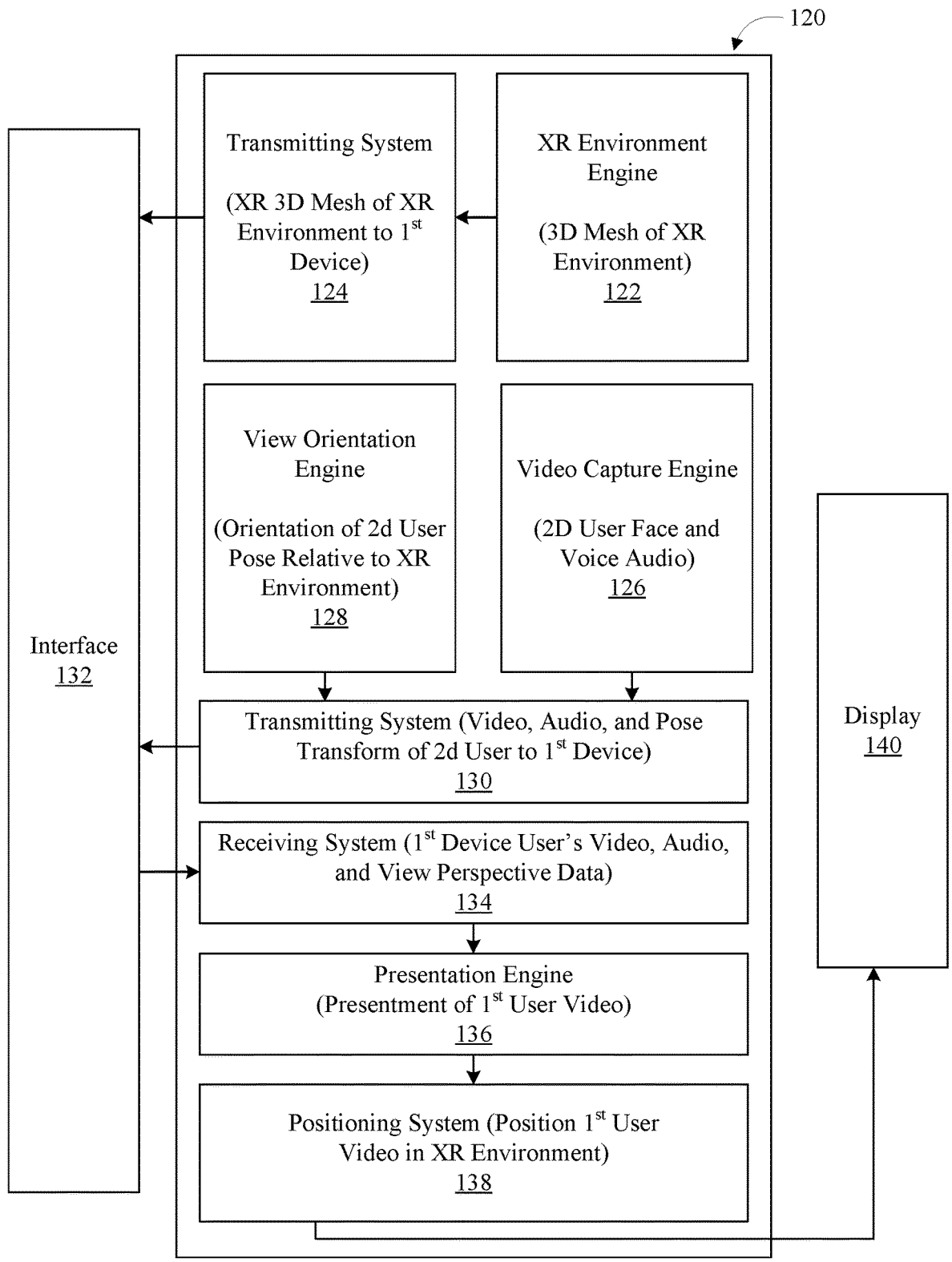

FIG. 1B illustrates example cooperating system 120 that can be integrated in an XR-capable device (second device), such as AR glasses, HMD, or other such device, which operatively couples with a non-XR-capable device (first device) in which system 100 is implemented for simulating physical copresence using heterogenous devices. Cooperating system 120 illustratively includes XR environment engine 122 for generating an XR environment as a 3D mesh and transmitting system 124 for transmitting the 3D mesh to the first device. Video capture engine 126 captures video (e.g., depth video) images of a user of the second device, and view orientation engine 128 orients the pose of the video images of the second device user within the XR environment. Transmitting system 130 conveys the video, audio, and pose transforms corresponding to the orientation of the video images of the second device user within the XR environment to the first device via interface 132. Via interface 132, receiving system 134 receives from the first device video of the first device user, audio, and view perspective data for compositing the video images of the first device user within the XR environment. Based on the view perspective data, presentation engine 136 composites the video images of the first device user within the XR environment (e.g., as a dynamically poised video plane). Positioning system 138 positions the video images in the context of the XR environment for viewing on display 140 (e.g., AR glasses).

Figure 2:
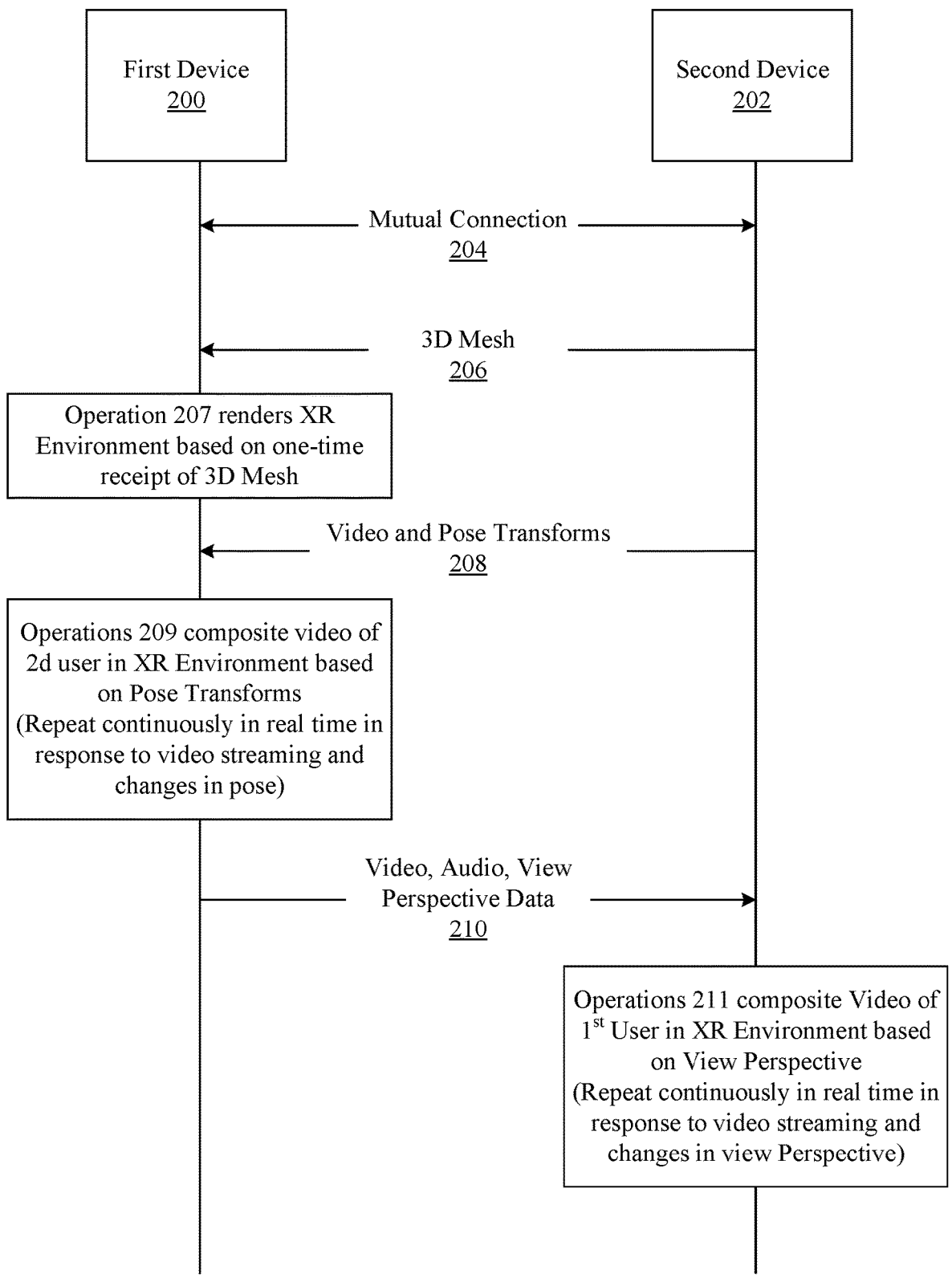
FIG. 2 schematically depicts data exchanges between heterogenous devices, at least one of which is configured to implement the example system of FIG. 1.

FIG. 2 illustrates an example data exchange between first device 200, which lacks XR capability but implements system 100, and second device 202 that is endowed with XR capability. Following the establishment of mutual connection (wired or wireless) 204 between the separate devices, first device 200 receives 3D mesh 206 from second device 202. The 3D mesh need be conveyed from second device 202 to first 200 only once. Received 3D mesh 206 is used by the first device to perform operation 207 which generates an XR environment on a display of the first device. Video and pose transforms 208 of a user of the second device 202 are also received by first device 200 from second device 202. First device 200 performs operations 209 using video and pose transforms 208 received from second device 202. Although the 3D mesh need be conveyed from second device 202 to first 200 only once, video and pose transforms 208 of the second device user can be conveyed continuously for rendering video (e.g., real-time streaming) of the second device user within the XR environment displayed with first device 200. Thus, operations 209 can repeat in response to continuously receiving new video (e.g., streaming) and pose transforms during a holocall, the pose transforms for compositing video images of the second device user within the XR environment displayed by first device 200.

First device 200 conveys video, audio, and view perspective data 210 to second device 202. Second device 202 performs operations 211 to composite video images of the first device user in the same XR environment displayed by second device 202. Video, audio, and view perspective data 210 also can be continuously conveyed (e.g., streamed) from first device 200 to second device 202. Thus, operations 211 can be continuously repeated during a holocall for rendering video of the first device user within the XR environment in real time based on video, audio, and view perspective data 210 continuously received during the holocall. The continuous and concurrent data exchange between first device 200 and second device 202 facilitates a real-time holocall, notwithstanding that the devices are heterogeneous devices.

Through such data exchanges, one or both users of heterogenous devices can change a view perspective of the video image of the other during the holocall. The change of view perspective using one device is mirrored by a change in view perspective using the other device. Aspects of this operative feature of a system for simulating physical copresence using heterogenous devices are illustrated in FIGS. 3A-3H. The data exchanges are ongoing and continuous during a holocall, and the operations described take place in real time.

FIGS. 3A-3H depict users 300 and 302 engaging in a holocall. User 300 illustratively employs a smartphone 304 which lacks XR capabilities but in which system 100 is implemented. Illustratively, changes in view perspective are invoked by hand gestures of the first user using a touch screen capability of smartphone 304.

Figure 3A:
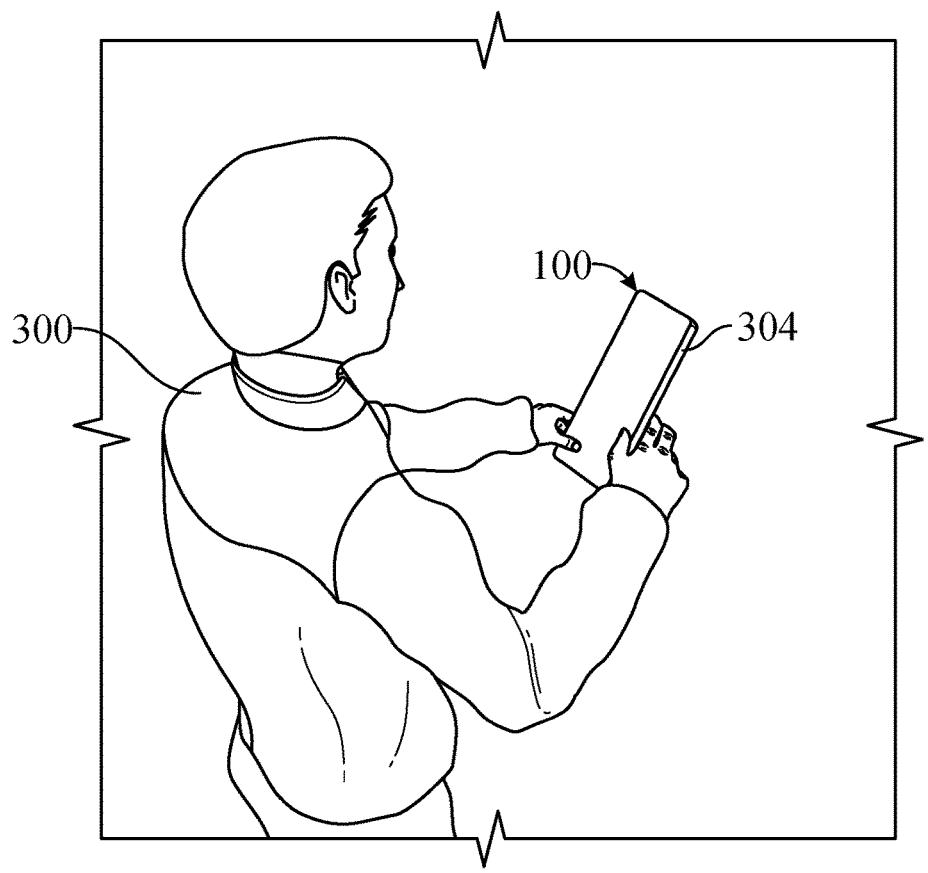
FIGS. 3A-3H illustrate certain operative aspects of the example system of FIG. 1.
Figure 3B:
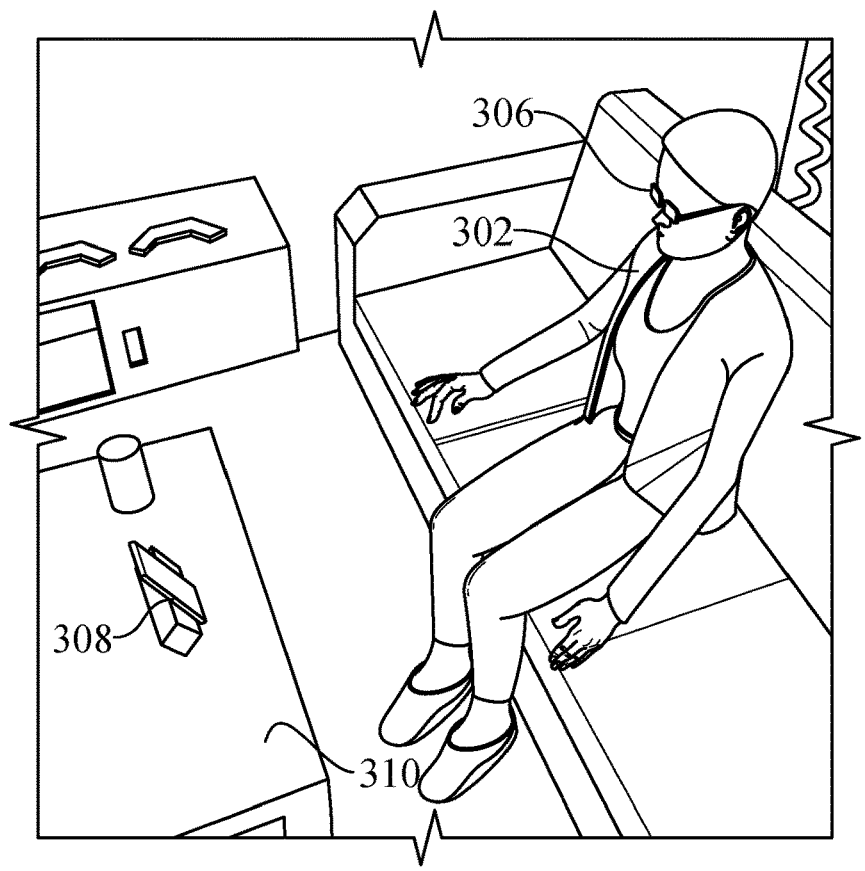

In FIG. 3A user 300 holds smartphone 304 so that a forward-facing camera embedded therein captures a video comprising facial images of user 300. In FIG. 3B user 302 wears XR glasses 306, which display an XR environment generated by XR glasses 306. XR glasses 306, in a particular arrangement, generates a 3D mesh corresponding to the XR environment from captured video of the vicinity of user 302. The video can be captured, for example, by user 302 scanning the vicinity with a camera such as one embedded in smartphone 308 which is operatively coupled to XR glasses 306. Alternatively, for example, the video can be captured using a forward-facing camera integrated in XR glasses 306. After capturing the images used by XR glasses 306 to generate the XR environment, user 302 positions smartphone 308 on low table 310 to dynamically capture facial images of user 302. XR glasses 306 generate the 3D mesh for the XR environment captured by the video.

Figure 3C:
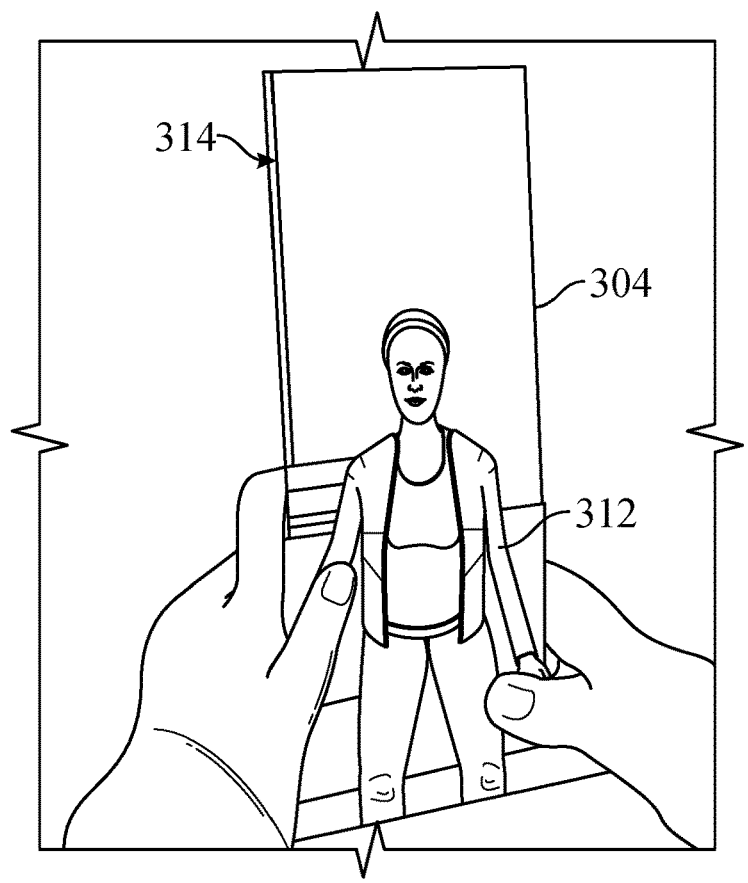
Figure 3D:
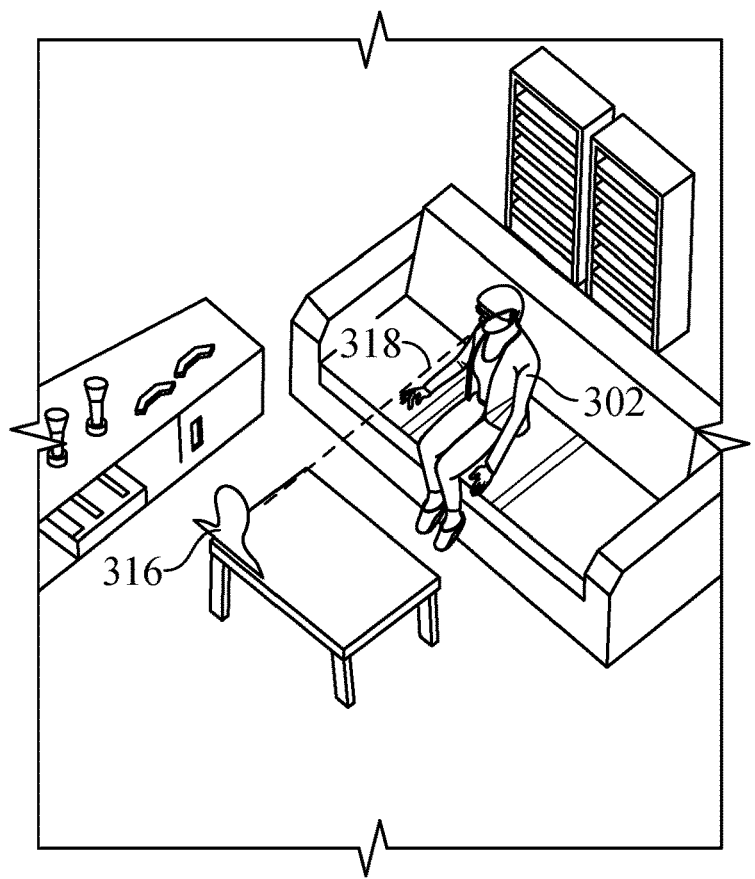

In FIG. 3C, user 300 sees video image 312 of user 302 composited within the XR environment generated by smartphone 304 from the received 3D mesh. In FIG. 3D, within the same XR environment, user 302 sees virtual image 316. Video image 312 of user 302, as seen within the XR environment, is displayed on screen 314 of smartphone 304. The XR environment is generated for display on screen 314 by smartphone 304 using the 3D mesh which XR glasses 306 generate and convey to smartphone 304. Virtual image 316 of user 300, as seen within the same XR environment, is presented to user 302 in FIG. 3D, the virtual image 316 generated from video captured by smartphone 304 and transmitted by smartphone 304 to XR glasses 306 along with view perspective data corresponding to the view perspective of user 300 for positioning virtual image 316 within the XR environment. As indicated by line of sight 318 in FIG. 3D, the view perspective of virtual image 316 as seen by user 302 is a straightforward view perspective, as is the view perspective of the image of user 302 in video image 312 seen by user 300 using smartphone 304.

The position of virtual image 316 of user 300 is dictated by the view perspective data generated in response to gestural movements of user 300 that are captured by smartphone 304 and conveyed to XR glasses 306. The view perspective of user 300 can change in response to the gestural movements and video image 316, as seen with XR glasses 306, can correspondingly change based on the view perspective data received from smartphone 304. Changes in user 300's view perspective in response to the gestural movements of user 300 thus generate the view perspective data that invokes changes in video image 316, as seen with XR glasses 306, when conveyed to XR glasses 306 from smartphone 304. As XR glasses 306 receive newly generated view perspective data from smartphone 304, virtual image 316 of user 300, as seen within the same XR environment, changes accordingly to mirror user 300's change in view perspective.

Figure 3E:
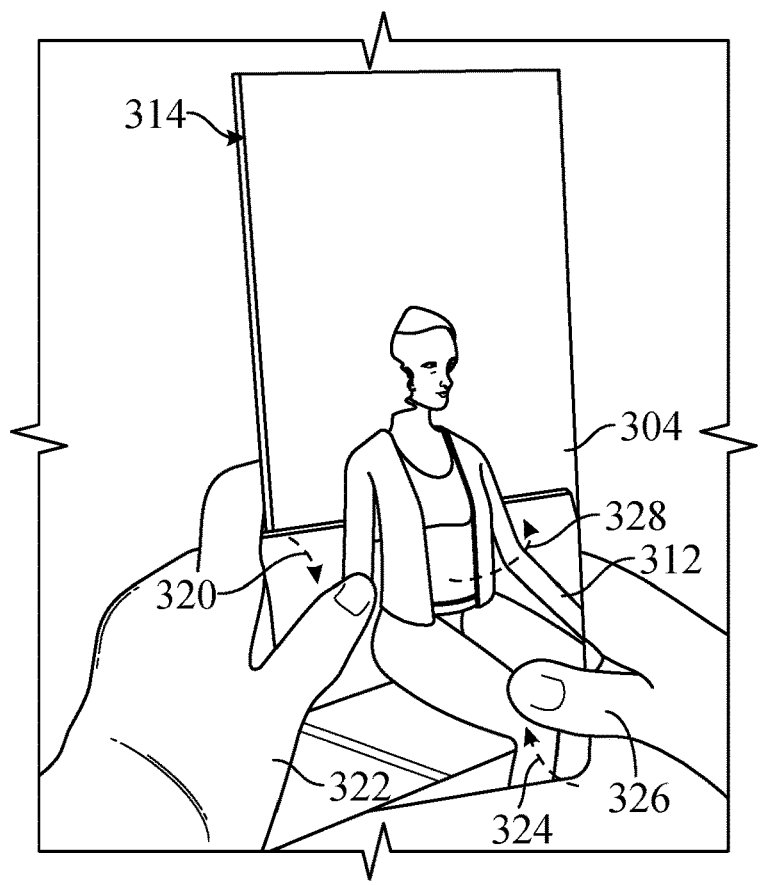

In FIG. 3E, downward swipe 320 of the left thumb 322 of user 300, coupled with upward swipe 324 of the user's right thumb 326, on touch screen 314 of smartphone 304 effects rotation 328 of the image of user 302. Rotation 328 changes the view perspective of user 300, giving user 300 a rightward, semi-profile view of the image of user 302 in the XR environment. In other arrangements, single-finger gestures can alternatively be used. For example, by moving a single finger to the right, the user can move the view more to the left. A single finger translation gesture on the screen can rotate the user's view. A two-finger, same-direction translation can translate the view. A two-finger pinch can translate the view away or backward. A two-finger pinch out can translate the view forward. It will be readily apparent to one of ordinary skill in the art that various finger (single or multiple) gestures can be used to change a view perspective.

Figure 3F:
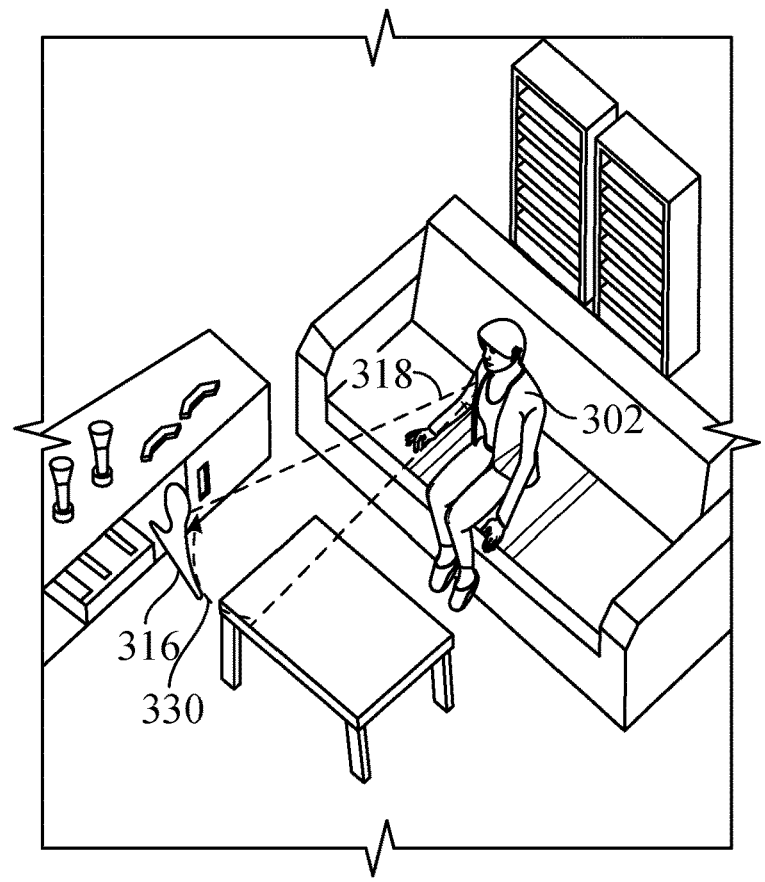

The change in view perspective of user 300 generates view perspective data that is conveyed by smartphone 304 to XR glasses 306 and mapped relative to the shared anchor of the common coordinate system. The mapping invokes movement of video images of user 300 within the XR environment seen by user 302 viewing the XR environment with XR glasses 306. The movements correspond to the change in view perspective of user 300 and are based on the view perspective data generated by smartphone 304 and conveyed to XR glasses 306. Accordingly, the change in view perspective of user 300 is matched by rotation 330 in FIG. 3F. The rotation is based on new view perspective data generated in response to gestural movements of user 300 and conveyed from smartphone 304 to XR glasses 306. The newly received view perspective data rotates virtual image 316 in the XR environment seen with XR glasses 306, the rotation corresponding to and commensurate with the change in user 300's view perspective using smartphone 304. Rotation 328 seen in FIG. 3E changes the view perspective of user 300 viewing screen 314, giving user 300 a rightward, semi-profile view of video image 312 of user 302. Rotation 330 results in a commensurate shift based on the received view perspective data, of virtual image 316 as seen in FIG. 3F. Specifically, line of sight 318, in FIG. 3F, shifts such that virtual image 316 moves rightward relative to user 302 in the XR environment. The rotation can be in any direction and along any axis.

Figure 3G:
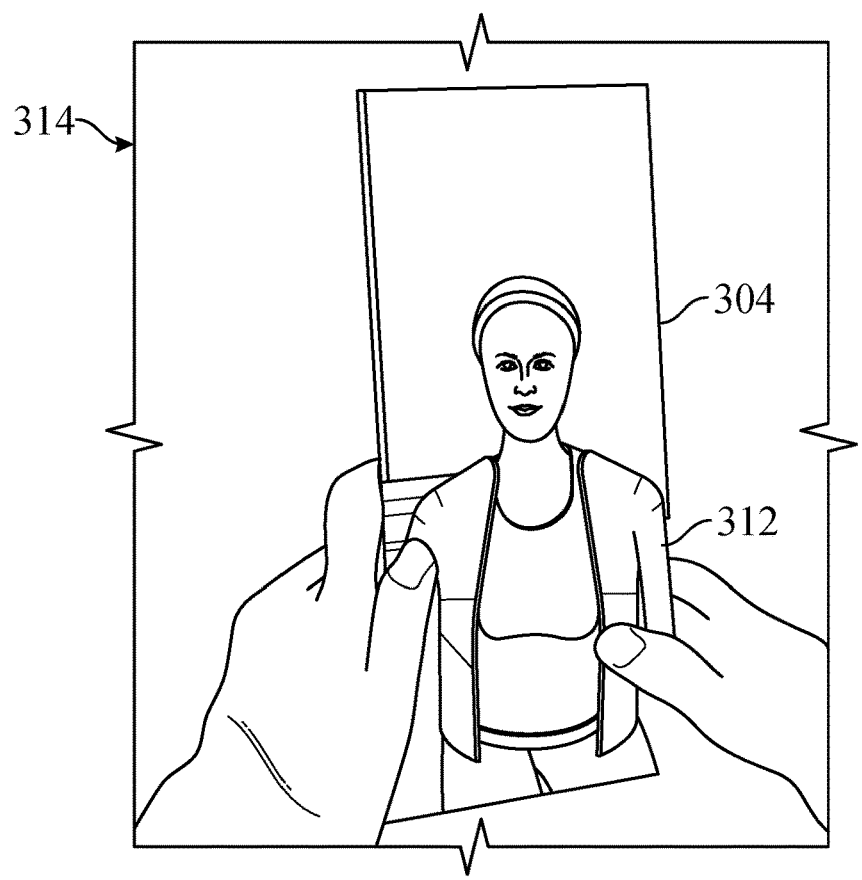
Figure 3H:
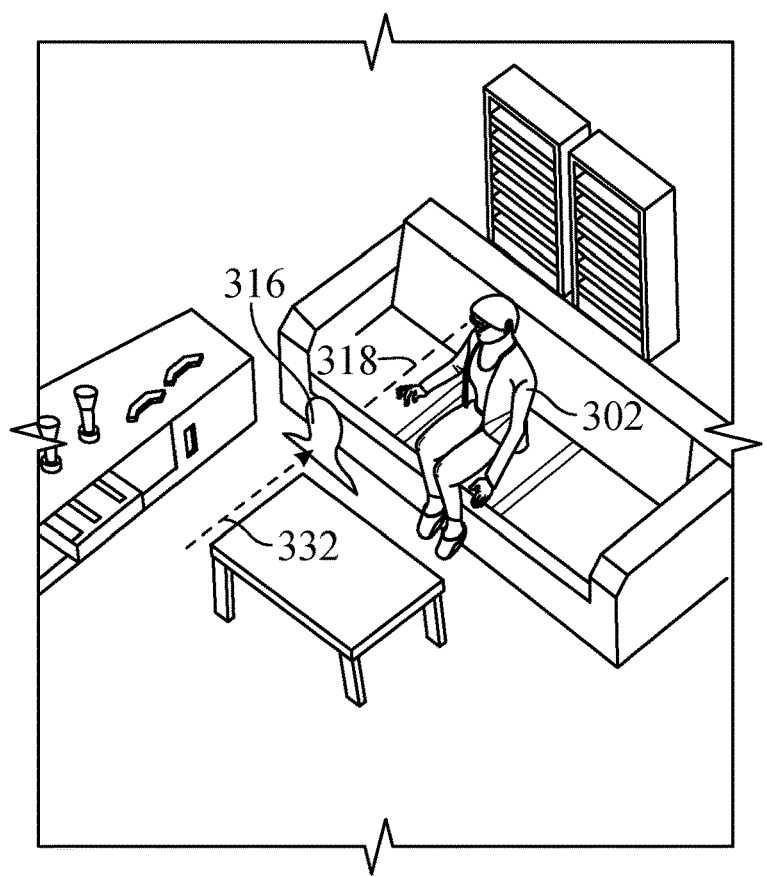

In FIG. 3G, similar gestural movements of user 300 generating inputs to smartphone 304, advance video image 312 of user 302, enlarging the image of user 302 as seen within the XR environment displayed on smartphone 304. The gestural movements of user 300 also generate new view perspective data that is conveyed to XR glasses 306 from smartphone 304 to invoke a corresponding change in virtual image 316 within the XR environment seen by user 302 in FIG. 3H. As illustrated in FIG. 3H, the view perspective data invokes a corresponding change in the view perspective of user 302 by advancing virtual image 316 a distance 332 along line of sight 318 toward user 302. The joint effect is to give user 300, using smartphone 304, a sense of moving closer toward user 302 in the XR environment, while giving user 302, using XR glasses 306 the experience of user 300 moving closer as virtual image 316 advances distance 332 within the same XR environment.

Referring again to FIG. 1, in various arrangements, interface 102 links view perspective engine 114 to the touch screen of smartphone 204. The touch screen can detect single-finger touch and drag, two-finger touch and drag, two-finger pinch-and-zoom, double tap, and/or other such physical movements of the first user. View perspective engine 114 can respond to a touch with a raycast from screen center to determine a mesh collision point and set a rig parent, which rotates on an axis in response the user dragging a finger over the screen. A two-finger touch can elicit a raycast from the finger midpoint to determine a 3D mesh collision point to establish a 3D translation plane from normal point to raycast collision point, or if followed by a pinch-and-zoom, a movement of a pose along a different axis commensurate to the ratio of current distance to an original distance (determined by the extent of the drag). A double tap can evoke an image movement along an axis by a system-defined amount. The different finger movements generate new pose transforms relative to a shared anchor to thereby coordinate changes in view perspectives as seen separately on the two heterogeneous devices.

In other arrangements, view perspective engine 114 generates data in response to the first user's physical movement of the first device, movements detected by an IMU (not shown) of the device (e.g., smartphone). The sensed movements generate data that can be used by view perspective engine 114 to update or construct a mapping of the XR environment while simultaneously tracking the first user's physical movement using a simultaneous localization and mapping (SLAM) algorithm. The algorithm can be based on statistical techniques, including, for example, Kalman filters, Monte Carlo methods, and covariance intersections. A SLAM algorithm, in some arrangements, is implemented by view perspective engine 114 for generating pose transforms. In other arrangements, data generated by view perspective engine 114 can be conveyed to the second device, which can be configured to implement the SLAM algorithm.

As the first user moves within the first user's local environment, a new pose of the first user is calculated relative to the shared anchor. Using a SLAM algorithm the first user's movements are translated into mapping data. In certain embodiments, data used for determining changed view perspectives can be generated from images captured by a rear-facing camera of the first device. The SLAM algorithm can determine a re-positioning of the image of the first user. View perspective engine 114 along with video and voice capture engine 118 convey view perspective data as well as video and audio 116 via interface 102 for transmission to the second device to effect a change in orientation of the video image of the first user, as displayed by the second device, within the XR environment. The orientation of the image of the second user as projected into the XR environment on display 108 is changed by remote positioning image 110 and, with respect to the first user image projected onto the XR environment, by local positioning engine 112.

In addition to responding to user-initiated actions such as those described already, systems for simulating physical copresence in other arrangements respond to one or more system-based predefined events. For example, in some arrangements, a system for simulating physical copresence using heterogeneous devices is configured to change view perspectives based on the face position of the user of the heterogenous device (first device) in which the system is implemented but which lacks XR capabilities. The system can be operatively coupled with a camera embedded in the first device that is able to perform camera-based tracking to determine the user's face position. In response to detecting a change in face position, the system changes the view perspective of the XR environment, including the video of the second user, rendered on the first device display. The system also transmits view perspective data from the first device to the other heterogeneous device (second device) for causing a corresponding change in view perspective of the XR environment, including composited images, rendered on the display of the second device.

The operative effect is illustrated in FIGS. 4A and 4B, illustrating views rendered on a heterogeneous device, first device (e.g., smartphone) 400 which lacks XR capability but in which a system for simulating physical copresence using heterogeneous devices is implemented. In FIG. 4A, facial image 402 of the user of first device 400 is composited in the XR environment rendered on display 404 of first device 400. In FIG. 4B, facial image 406 shows the face position of the user rotated. The system for simulating physical copresence, accordingly, rotates the view perspective of the XR environment rendered on display 404 of first device 400. Additionally, the system also transmits view perspective data from the first device to the other heterogeneous device (second device) to effect a corresponding change in view perspective of the XR environment, including composited images, rendered on a display of the second device. Thus, the user is able to change the view perspective with a head movement, for example. The user, with a head turn from center facing to leftward facing, for example, can see less of the left side of the XR environment and more of the right side.

In still other arrangements, predefined input is generated in response to a system-based event in which one or more users of the heterogeneous devices share media with the other user(s). Still referring to FIGS. 4A and 4B, the operative effects of the operation are illustrated. In FIG. 4A display 404 shows media illustrated by image 408 composited in the display of first device 400. The system changes the view perspective of the XR environment in conjunction with a dynamic change in media, the change illustrated by image 410 in which a green dinosaur appears to run across the XR environment.

Figure 5A:
FIGS. 5A-5C illustrate certain operative aspects of the example system of FIG. 1.
Figure 5B:
Figure 5C:

In yet other arrangements, a system for simulating physical copresence using heterogeneous devices generates data in a first device (lacking XR capability but implementing the system) for rendering an image of a user of the first device and transmitting the data to a second device (XR capable) for progressively enhancing the image in video frames shown on a display of the second device. The operative effects of the operations are illustrated in FIGS. 5A-5C. In FIG. 5A, in which neither a video segmentation capability nor depth frame imaging is available, video image 500 of the first user appears in the second user's view of the XR environment with background 502 of the first user's vicinity (captured by a camera of the first device). The video image provides a slate view of the first user. If the video segmentation capability is available, the system-generated data enables the second device to render video image 500 with background 502 extracted from the video image thereby providing a cutout view, as shown in FIG. 5B. If video segmentation capability and depth frame imaging are available, then the system generated data enables the second device to render video image 500 as a 3D view within XR environment 504, as shown in FIG. 5C. The view is enhanced by reprojecting image pixels via a shader and reducing image smearing by culling imaging triangles that are outside an expected range.

In various arrangements, the 3D mesh, which is used for rendering an XR environment, can be generated from images scanned with a camera integrated in or operatively coupled with the heterogeneous device having XR capabilities. For example, the camera can be a forward-facing camera of an HMD. The camera, for example, can be an embedded camera of a separate device (e.g., smartphone) operatively coupled with the device having XR capabilities (e.g., HMD). In other arrangements, the 3D mesh, which is used for rendering an XR environment, can be generated from images scanned by a user of the heterogeneous device lacking XR capability. For example, the user can scan with a camera embedded in a smartphone the immediate vicinity of the user and convey the resulting images to the user of the device having XR capability for generating the 3D mesh. Thus, the users of the heterogeneous devices can engage in a holocall in which the shared XR environment is the vicinity of either of the users, whether an office, living room, or other surrounding area. In still other arrangements, the XR environment shared by the users during the holocall can be a completely VR environment or an MR environment. In other arrangements, an XR environment rendering can be different for each user with each user's device displaying an image of the other user within the rendered environment.

Figure 6A:
FIGS. 6A-6D illustrate certain operative aspects of the example system of FIG. 1.
Figure 6B:
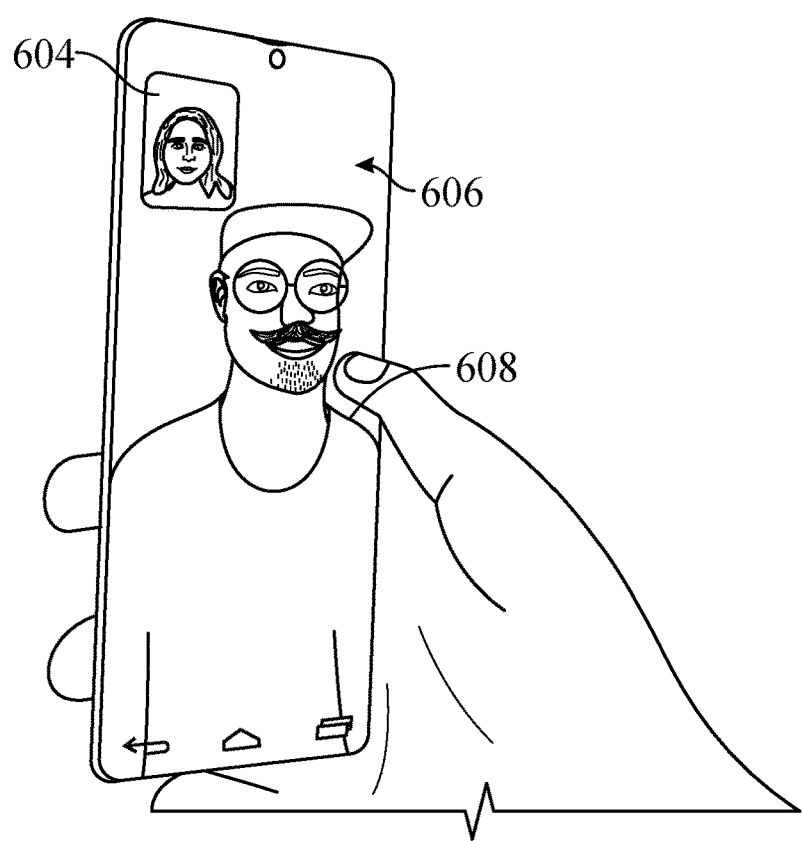
Figure 6C:
Figure 6D:
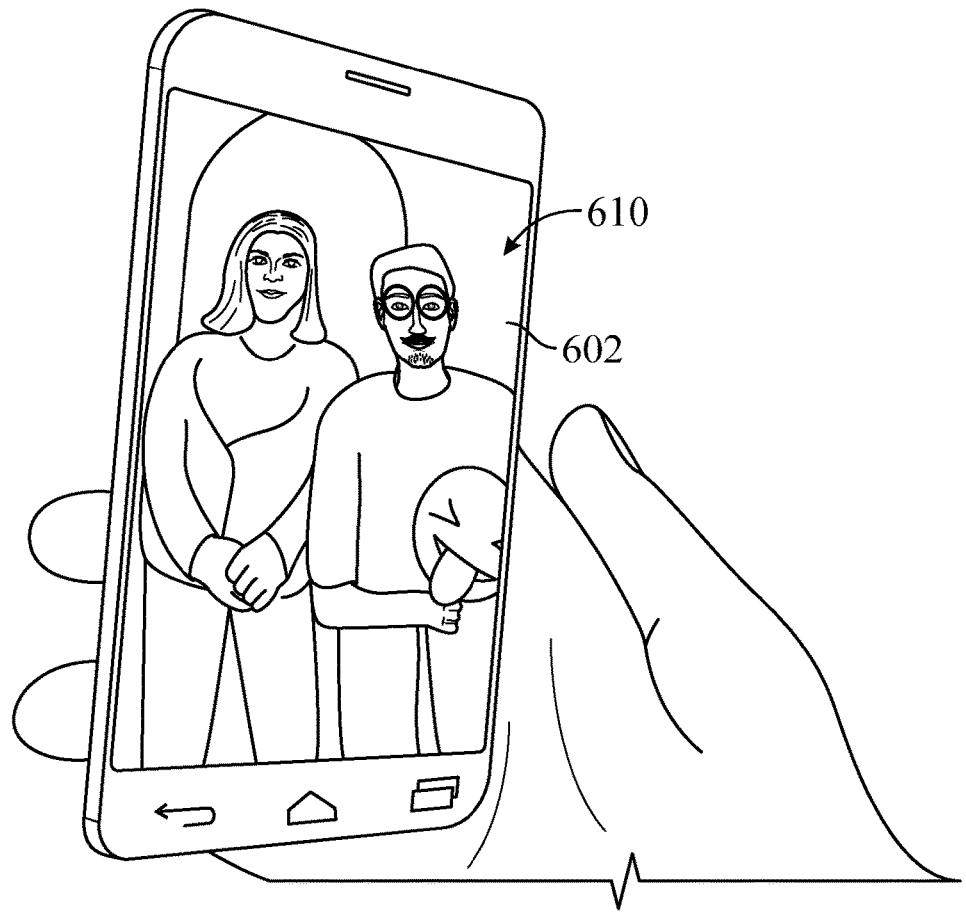

In other arrangements, a system for simulating physical copresence using heterogeneous devices can optionally create a virtual camera for capturing so-called "selfies." The selfie includes images of a user of a first device lacking XR capabilities but implementing the system and of a user of the second device endowed with XR capability. Operatively, the first user captures a self-image video with the first device and the second user does likewise with the second device, with both devices generating pose transforms that are shared between the devices. Based on the pose transforms, one or both of the respective devices composites user images side-by-side within an XR environment generated from a 3D mesh. FIGS. 6A-6C illustrate an example of the system's process of generating a selfie. In FIG. 6A, first user 600 using smartphone 602 captures a self-image, which is conveyed to a second device. In FIG. 6B, image 604 of first user 600 is composited in XR environment 606 rendered by a 3D mesh generated by and received from the second device. Image 608 of the second user, captured with a camera integrated in or operatively coupled with the second device, is likewise composited in XR environment 606. In FIG. 6C, image 610 in which images of both users are composited against a different view of the XR environment is shown as it appears on a display of the second device (e.g., HMD), which is XR capable. Image 620 is shown as it appears on the display of smartphone 602 in FIG. 6D.

Either user can initiate the system-implemented sequence for rendering a selfie. The users orient themselves side by side within the XR environment while maintaining visibility to a camera (e.g., embedded camera in smartphone, camera operatively coupled to an HMD) and a virtual camera is created by the system with camera poses controlled by inputs from the device used by the initiating user. Optionally, one or both the first device and second device can electronically store the resulting image(s) or load the selfie to memory of a separate device operatively coupled to the first and/or second device.

Figure 7:
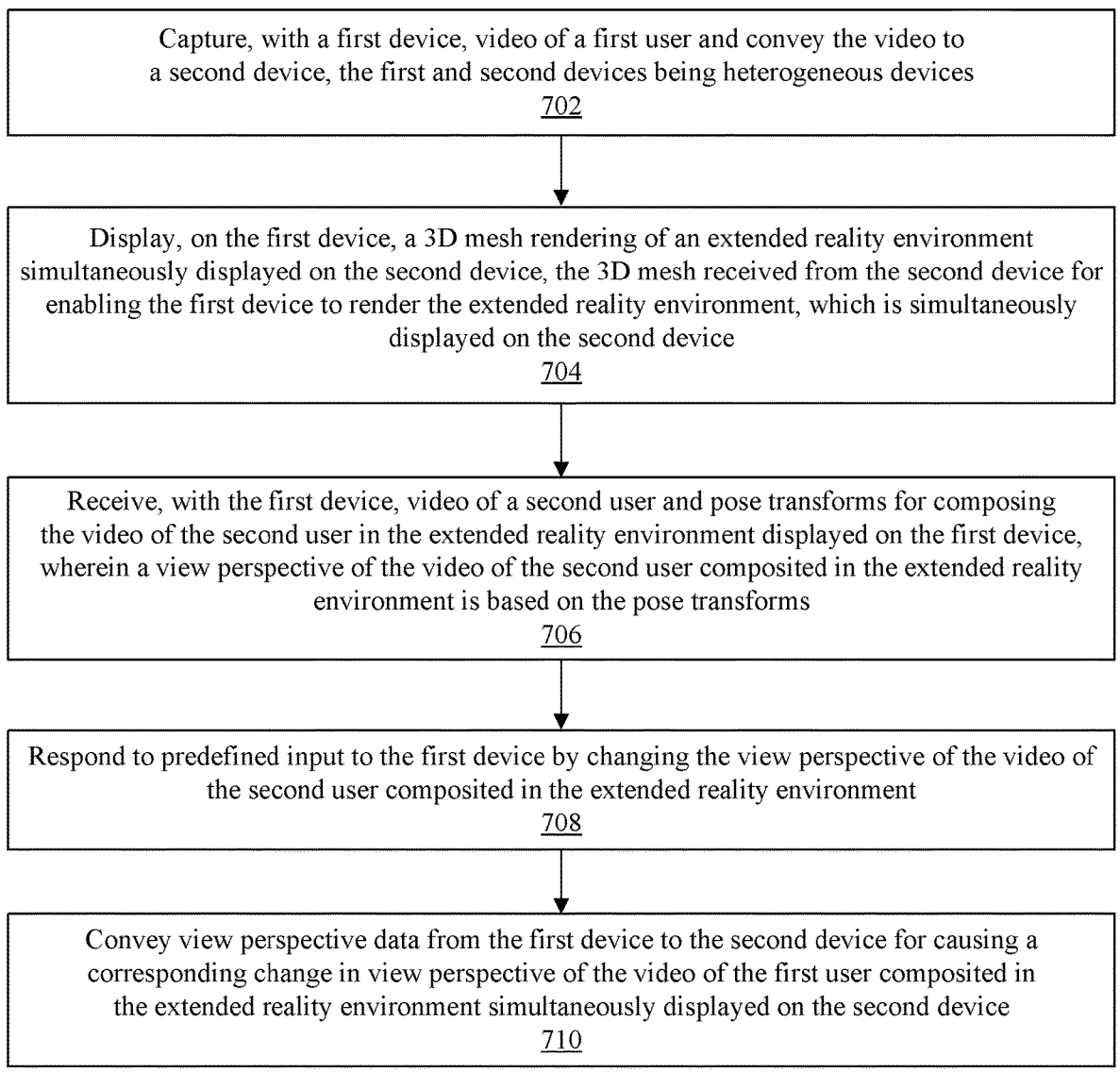
FIG. 7 illustrates an example method of facilitating holocalls using heterogeneous devices, one of which implements the example system of FIG. 1.

FIG. 7 illustrates an example holocall facilitation method (method) 700. Method 700 can be performed by a system such as system 100 (FIG. 1A). The system at block 702 captures, with a first device, video of a first user and conveys the video to a second device. The first and second devices are heterogeneous devices. The first device, in which the system is implemented lacks XR capabilities. The second device is endowed with XR capabilities.

At block 704, the system displays on the first device a 3D mesh rendering of an XR environment. The 3D mesh rendering of the XR environment displayed on the first device is based on a 3D mesh received by the first device from the second device for enabling the first device to render the XR environment. The XR environment can be simultaneously displayed on the second device. The second device, having XR capabilities, conveys the 3D mesh to the first device for rendering the XR environment on the first device. The second device does not need the 3D mesh to render the XR environment on the second device if the XR environment is the actual, physical environment of the second device or is a scan or other capture (e.g., via camera) of the actual, physical environment of the second device. If, however, the XR environment is a virtual environment, both the first and second devices can render the XR environment based on a 3D mesh.

The system at block 706 receives, with the first device, video of a second user along with pose transforms for compositing the video of the second user in the XR environment displayed on the first device. The system determines a view perspective of the video of the second user composited in the XR environment based on the pose transforms.

At block 708, the system responds to predefined input to the first device by changing the view perspective of the video of the second user composited in the XR environment. The system at block 710 conveys view perspective data from the first device to the second device for causing a corresponding change in view perspective of the video of the first user composited in the extended reality environment simultaneously displayed on the second device.

In certain arrangements, the system effects the corresponding change in view perspective of the video of the first user, as composited in the XR environment simultaneously displayed on the second device, so as to mirror, albeit from a perspective of the second user, the change in the view perspective of the video of the second user as displayed on the first device.

The system, in certain arrangements, responds to predefined input generated in response to a physical action of the first user. In some arrangements, the predefined input is generated in response to the first user making one or more hand gestures sensed by the first device. The system responds to the input by changing the view perspective of the video of the second user composited in the XR environment displayed on the first device. In other arrangements, the predefined input is generated in response to the first user moving the first device within a vicinity of the first user. The system, again, responds to the input by changing the view perspective of the video of the second user composited in the XR environment displayed on the first device.

In still other arrangements, the predefined input is generated in response to a system event, the event being the sharing of media on the first and second devices by one or more of the users. The system responds by changing the view perspective to accommodate the sharing of media on the first and second devices.

The system, in certain other arrangements, generates a virtual camera to capture side-by-side images of the first and second users and composites the side-by-side images in the extended reality environment simultaneously displayed on the first and second devices.

Figure 8:
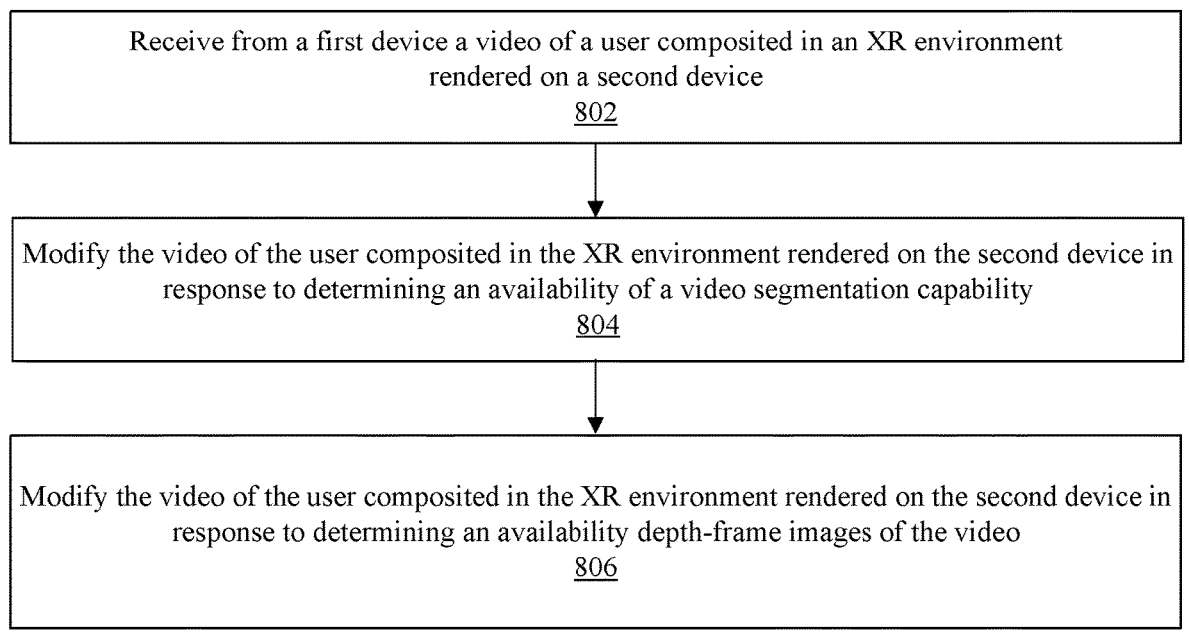
FIG. 8 illustrates an example XR video enhancement method performed using the example system of FIG. 1.

FIG. 8 illustrates an example XR video enhancement method (method) 800. Method 800 can be performed using a system such as system 120 (FIG. 1B). The system at block 802 receives from a first device a video of a user composited in an XR environment rendered on a second device. The video provides a slate view of the user. The first device lacks XR capabilities but implements a system for simulating physical copresence using heterogeneous devices. The second device is a heterogeneous device endowed with XR capabilities.

At block 804, the system modifies the video in response to determining the availability of a video segmentation capability. The video is modified by extracting the background of an image of the user in the video, rendering a 2D cutout view. The system at block 806 modifies the video in response to determining the availability of depth-frame images within the video. The result is a 3D view of the user. The system can actively determine the availability of video segmentation and/or depth-frame images in the second device and then initiate the actions described based on the active determination.

Figure 9:
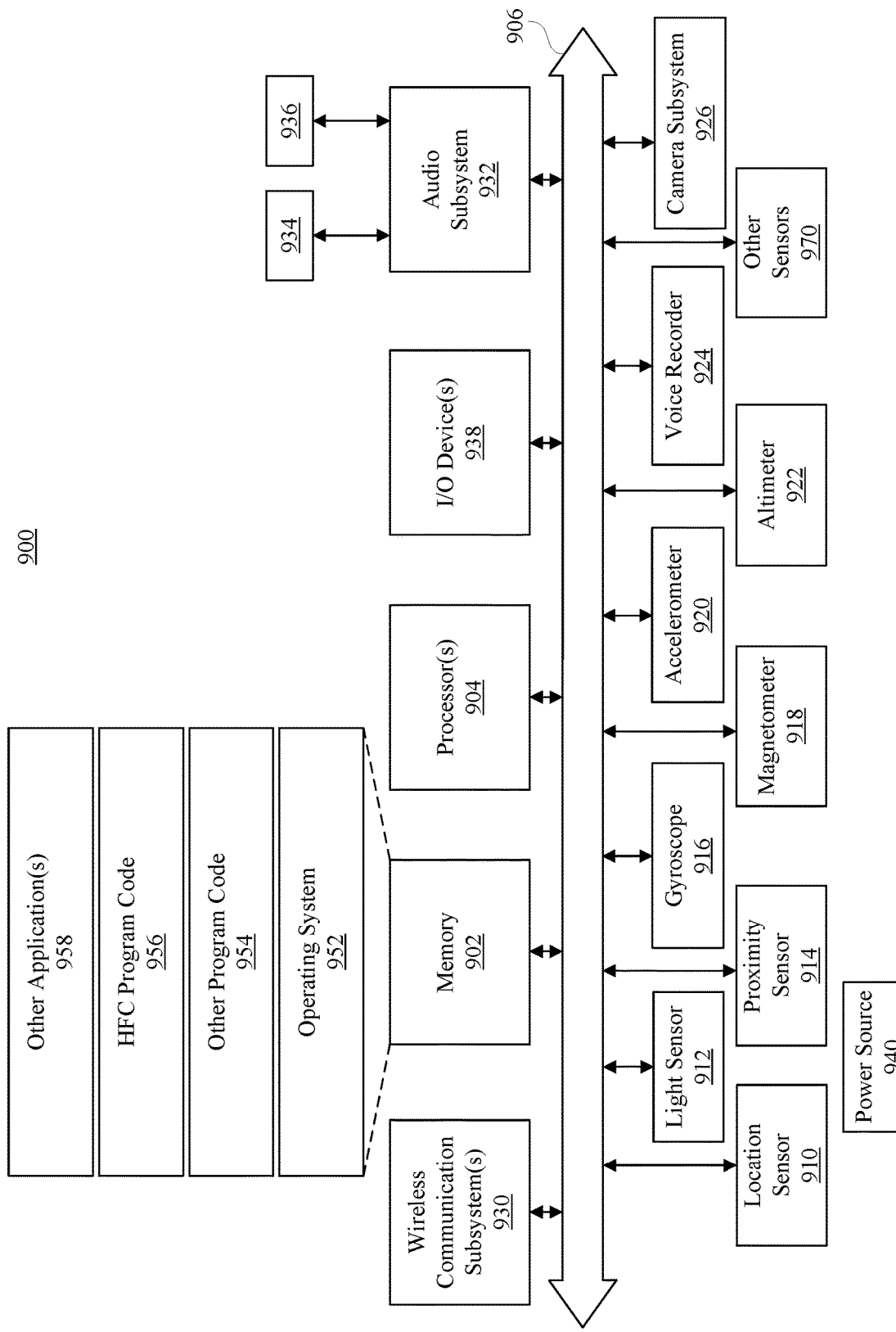
FIG. 9 depicts an example portable device.

FIG. 9 illustrates an example portable device 900 in accordance with one or more embodiments described within this disclosure. Portable device 900 can include a memory 902, one or more processors 904 (e.g., image processors, digital signal processors, data processors), and interface circuitry 906.

In one aspect, memory 902, processor(s) 904, and/or interface circuitry 906 are implemented as separate components. In another aspect, memory 902, processor(s) 904, and/or interface circuitry 906 are integrated in one or more integrated circuits. The various components of portable device 900 can be coupled, for example, by one or more communication buses or signal lines (e.g., interconnects and/or wires). In one aspect, memory 902 may be coupled to interface circuitry 906 via a memory interface (not shown).

Sensors, devices, subsystems, and/or input/output (I/O) devices can be coupled to interface circuitry 906 to facilitate the functions and/or operations described herein, including the generation of sensor data. The various sensors, devices, subsystems, and/or I/O devices may be coupled to interface circuitry 906 directly or through one or more intervening I/O controllers (not shown).

For example, location sensor 910, light sensor 912, and proximity sensor 914 can be coupled to interface circuitry 906 to facilitate orientation, lighting, and proximity functions, respectively, of portable device 900. Location sensor 910 (e.g., a GPS receiver and/or processor) can be connected to interface circuitry 906 to provide geo-positioning sensor data. Other sensors can include an IMU, comprising gyroscope 816, magnetometer 818, accelerometer 820. Gyroscope 816 can be connected to interface circuitry 806 to provide sensor data for measuring angular velocity. Magnetometer 818 can be connected to interface circuitry 806 to provide sensor data that can be used to determine the direction of magnetic North for purposes of directional navigation. Accelerometer 820 can be connected to interface circuitry 806 to provide sensor data that can be used to determine change of speed and direction of movement of a device in three dimensions. Altimeter 922 (e.g., an integrated circuit) can be connected to interface circuitry 906 to provide sensor data that can be used to determine altitude. Voice recorder 924 can be connected to interface circuitry 906 to store recorded utterances.

Camera subsystem 926 can be coupled to an optical sensor 928. Optical sensor 928 can be implemented using any of a variety of technologies. Examples of optical sensor 928 include a charged coupled device (CCD), a complementary metal-oxide semiconductor (CMOS) optical sensor, and the like. Camera subsystem 926 and optical sensor 928 can be used to facilitate camera functions, such as recording images and/or video clips (hereafter "image data"). In one aspect, image data is a subset of sensor data.

Communication functions can be facilitated through one or more wireless communication subsystems 930. Wireless communications subsystem(s) 930 can include radio frequency receivers and transmitters, optical (e.g., infrared) receivers and transmitters, and so forth. The specific design and implementation of wireless communication subsystem(s) 930 can depend on the specific type of portable device 900 implemented and/or the communication network(s) over which portable device 900 is intended to operate.

For purposes of illustration, wireless communication subsystem(s) 930 may be designed to operate over one or more mobile networks (e.g., GSM, GPRS, EDGE), a Wi-Fi network that may include a WiMax network, a short-range wireless network (e.g., a Bluetooth network), and/or any combination of the foregoing. Wireless communication subsystem(s) 930 can implement hosting protocols such that portable device 900 can be configured as a base station for other wireless devices.

Audio subsystem 932 can be coupled to a speaker 934 and a microphone 936 to facilitate voice-enabled functions, such as voice recognition, voice replication, digital recording, audio processing, and telephony functions. Audio subsystem 932 is able to generate audio type sensor data. In one or more embodiments, microphone 936 may be utilized as a respirator sensor.

I/O devices 938 can be coupled to interface circuitry 906. Examples of I/O devices 938 include, for example, display devices, touch-sensitive display devices, track pads, keyboards, pointing devices, communication ports (e.g., USB ports), network adapters, buttons or other physical controls, and so forth. A touch-sensitive device such as a display screen and/or a pad is configured to detect contact, movement, breaks in contact, and the like using any of a variety of touch sensitivity technologies. Example touch-sensitive technologies include, for example, capacitive, resistive, infrared, and surface acoustic wave technologies, other proximity sensor arrays or other elements for determining one or more points of contact with a touch-sensitive device, and the like. One or more of I/O devices 938 may be adapted to control functions of sensors, subsystems, and such of portable device 900.

Portable device 900 further includes a power source 940. Power source 940 able to provide electrical power to various elements of portable device 900. In one embodiment, power source 940 is implemented as one or more batteries. The batteries may be implemented using any of a variety of different battery technologies, whether disposable (e.g., replaceable) or rechargeable. In another embodiment, power source 940 is configured to obtain electrical power from an external source and provide power (e.g., DC power) to the elements of portable device 900. In the case of a rechargeable battery, power source 940 further may include circuitry that is able to charge the battery or batteries when coupled to an external power source.

Memory 902 can include random access memory (e.g., volatile memory) and/or non-volatile memory, such as one or more magnetic disk storage devices, one or more optical storage devices, flash memory, and so forth. Memory 902 can store operating system 952, such as LINUX, UNIX, a mobile operating system, an embedded operating system, and the like. Operating system 952 may include instructions for handling system services and for performing hardware-dependent tasks.

Memory 902 may store additional program code 954. Examples of other program code 954 may include instructions to facilitate communicating with one or more additional devices, one or more computers, and/or one or more servers; graphic user interface processing; processing instructions to facilitate sensor-related functions; phone-related functions; electronic messaging-related functions; Web browsing-related functions; media processing-related functions; GPS and navigation-related functions; security functions; camera-related functions, including Web camera and/or Web video functions; and so forth. Still other program code can include holocall facilitation code (HFC) 956 for implementing a holocall facilitation system (e.g., system 100), which facilitates holocalls using heterogeneous devices. Memory 902 may also store one or more other applications 958.

The various types of instructions and/or program code described are provided for purposes of illustration and not limitation. The program code may be implemented as separate software programs, procedures, or modules. Memory 902 can include additional instructions or fewer instructions. Moreover, various functions of portable device 900 may be implemented in hardware and/or software, including in one or more signal processing and/or application-specific integrated circuits.

Program code stored within memory 902 and any data used, generated, and/or operated on by portable device 900 are functional data structures that impart functionality to a device when employed as part of the device. Further examples of functional data structures include, for example, sensor data, data obtained via user input, data obtained via querying external data sources, baseline information, and so forth. The term "data structure" refers to a physical implementation of a data model's organization of data within a physical memory. As such, a data structure is formed of specific electrical or magnetic structural elements within a memory. A data structure imposes physical organization on the data stored in the memory that is used by a processor.

In certain embodiments, one or more of the various sensors and/or subsystems described with reference to portable device 900 may be separate devices that are coupled or communicatively linked to portable device 900 through wired or wireless connections. For example, one or more (or all) of location sensor 910, light sensor 912, proximity sensor 914, gyroscope 916, magnetometer 918, accelerometer 920, altimeter 922, voice recorder 924, camera subsystem 926, audio subsystem 932, and so forth may be implemented as separate systems or subsystems that operatively couple to portable device 900 by way of I/O devices 938 and/or wireless communication subsystem(s) 930.

Portable device 900 can include fewer components than those shown or include additional components other than those shown in FIG. 9 depending on the specific type of system that is implemented. Additionally, the particular operating system and/or application(s) and/or other program code included may also vary according to system type. Moreover, one or more of the illustrative components can be incorporated into, or otherwise form a portion of, another component. For example, a processor may include at least some memory.

Portable device 900 is provided for purposes of illustration and not limitation. A device and/or system configured to perform the operations described herein may have a different architecture than illustrated in FIG. 9. The architecture may be a simplified version of portable device 900 and may include a processor and memory storing instructions. The architecture may include one or more sensors as described herein. Portable device 900, or a similar system, can collect data using the various sensors of the device or sensors coupled thereto. It should be appreciated, however, that portable device 900 may include fewer sensors or other additional sensors. With this disclosure, data generated by a sensor is referred to as "sensor data."

Example implementations of portable device 900 include, for example, a smartphone or other mobile device or phone, a wearable computing device (e.g., smartwatch), a dedicated medical device or other suitable handheld, wearable, or comfortably carriable electronic device, capable of sensing and processing sensor-detected signals and data. It will be appreciated that embodiments can be deployed as a stand-alone device or deployed as multiple devices in a distributed client-server networked system. For example, in certain embodiments, a smartwatch can operatively couple to a mobile device (e.g., smartphone). The mobile device may or may not be configured to interact with a remote server and/or computer system.

Figure 10:
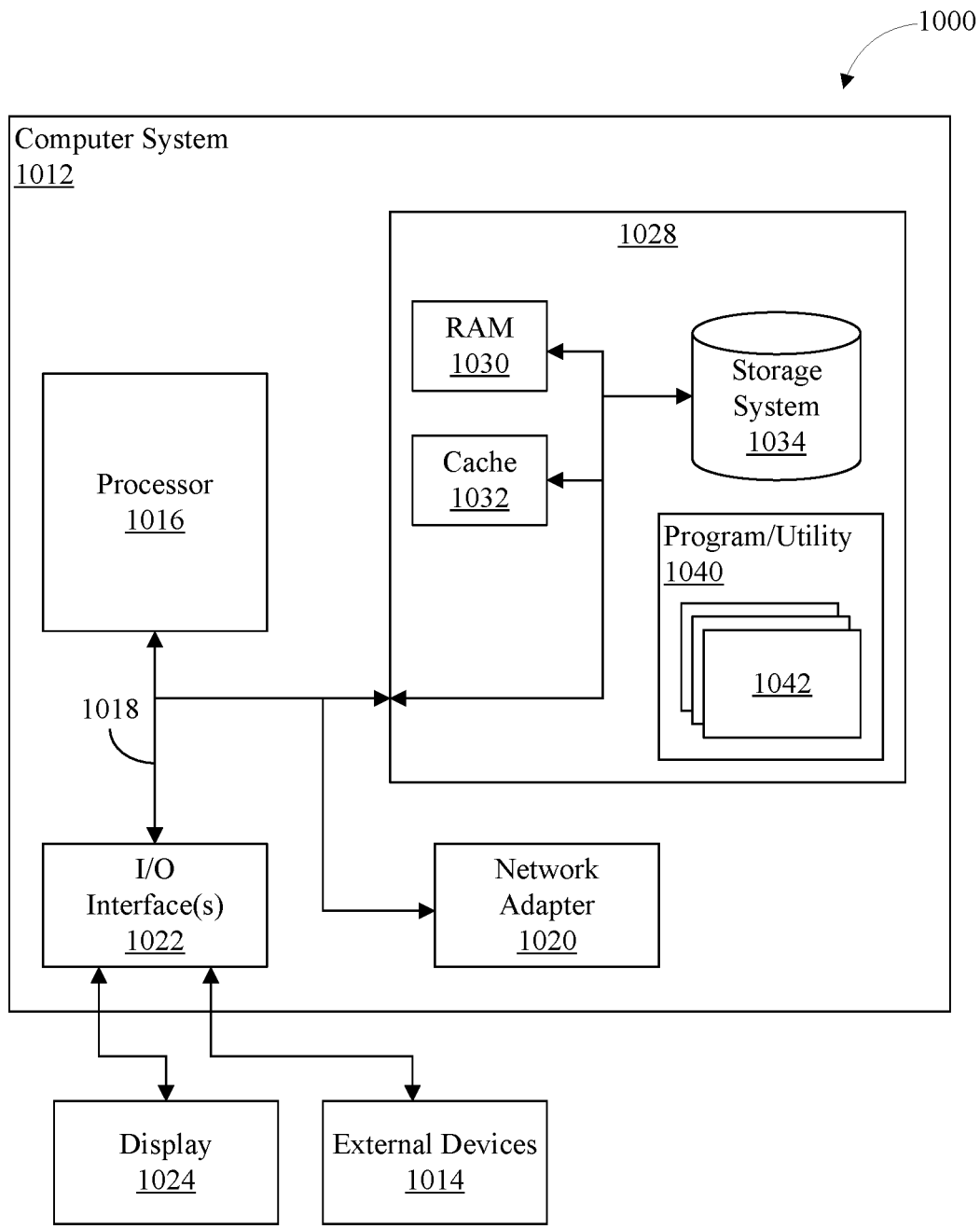
FIG. 10 depicts an example computing node.

FIG. 10 illustrates a schematic of an example of a computing node 1000, which lacks XR capability but can be used to implement a system for facilitating holocalls using heterogeneous devices. Computing node 1000 is not intended to suggest any limitation as to the scope of use or functionality of embodiments of the invention described herein. Computing node 1000 can perform any of the functionality described within this disclosure.

Computing node 1000 includes a computer system 1012, which is operational with numerous other general-purpose or special-purpose computing system environments or configurations. Examples of well-known computing systems, environments, and/or configurations that may be suitable for use with computer system 1012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 1012 may be described in the general context of computer system-executable instructions, such as program modules, being executed by a computer system. Generally, program modules may include routines, programs, objects, components, logic, data structures, and so on that perform particular tasks or implement particular abstract data types. Computer system 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system 1012 is shown in the form of a general-purpose computing device. The components of computer system 1012 may include, but are not limited to, one or more processors 1016, a memory 1028, and a bus 1018 that couples various system components including memory 1028 to processor 1016. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 1018 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 1012 typically includes a variety of computer system-readable media. Such media may be any available media that is accessible by computer system 1012, and may include both volatile and non-volatile media, removable and non-removable media.

Memory 1028 may include computer system readable media in the form of volatile memory, such as random-access memory (RAM) 1030 and/or cache memory 1032. Computer system 1012 may further include other removable/non-removable, volatile/non-volatile computer system storage media. By way of example, storage system 1034 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein. For example, one or more of the program modules may include system YZX96 or portions thereof.

Program/utility 1040 is executable by processor 1016. Program/utility 1040 and any data items used, generated, and/or operated upon by computer system 1012 are functional data structures that impart functionality when employed by computer system 1012.

Computer system 1012 may also communicate with one or more external devices 1014 such as a keyboard, a pointing device, a display 1024, etc.; one or more devices that enable a user to interact with computer system 1012; and/or any devices (e.g., network card, modem, etc.) that enable computer system 1012 to communicate with one or more other computing devices. Such communication can occur via input/output (I/O) interfaces 1022. Still, computer system 1012 can communicate with one or more networks such as a local area network (LAN), a general wide area network (WAN), and/or a public network (e.g., the Internet) via network adapter 1020. As depicted, network adapter 1020 communicates with the other components of computer system 1012 via bus 1018. It should be understood that although not shown, other hardware and/or software components could be used in conjunction with computer system 1012. Examples, include, but are not limited to: microcode, device drivers, redundant processing units, external disk drive arrays, RAID systems, tape drives, and data archival storage systems, etc.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The term "user" as defined herein refers to a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
capturing, with a first device, video of a first user and conveying the video to a second device, wherein the first device lacks extended reality capabilities and the second device is extended reality capable;
displaying, on the first device, a 3D mesh rendering of an extended reality environment based on a 3D mesh received from the second device for enabling the first device to render the extended reality environment, wherein the extended reality environment is simultaneously displayed on the second device;
receiving, with the first device, video of a second user and pose transforms for compositing the video of the second user in the extended reality environment displayed on the first device, wherein a view perspective of the video of the second user composited in the extended reality environment is based on the pose transforms;
responsive to predefined input to the first device, changing the view perspective of the video of the second user composited in the extended reality environment; and
conveying view perspective data from the first device to the second device as changed for causing a corresponding change in a location of the video of the first user composited in the extended reality environment simultaneously displayed on the second device;
wherein the corresponding change in the location of the video of the first user composited in the extended reality environment simultaneously displayed on the second device comprises a rotation of the first user about the second user.

2. The method of claim 1, wherein the corresponding change in view perspective of the video of the first user as composited in the extended reality environment simultaneously displayed on the second device mirrors, albeit from a perspective of the second user, the change in the view perspective of the video of the second user displayed on the first device.

3. The method of claim 1, wherein the displaying the 3D mesh rendering of the extended reality environment on the first device includes generating, by the first device, a mesh model based on the 3D mesh generated by the second device, wherein the generating the mesh model includes:
dividing a point cloud corresponding to the extended reality environment into a plurality of non-overlapping regions;
generating 2D image planes by projecting each non-overlapping region to a virtual camera;
triangulating the point cloud onto a virtual image plane corresponding to the 2D image planes; and
back-projecting each 2D image plane onto a 3D space.

4. The method of claim 1, wherein the predefined input is generated in response to a system event in which the view perspective changes to accommodate a sharing of media on the first and second devices.

5. The method of claim 1, further comprising generating a virtual camera to capture side-by-side images of the first and second users and compositing the side-by-side images in the extended reality environment simultaneously displayed on the first and second devices.

6. The method of claim 1, further comprising modifying the video of the first user displayed on the second device based on determining an availability of a video segmentation capability.

7. The method of claim 1, further comprising modifying the video of the first user displayed on the second device based on determining an availability of depth-frame images.

8. The method of claim 1, wherein the 3D mesh rendering is acquired by the first device using a video camera embedded in or operatively connected with the first device.

9. A system, comprising:
a processor configured to initiate operations including:
capturing, with a first device, video of a first user and conveying the video to a second device, wherein the first device lacks extended reality capabilities and the second device is extended reality capable;
displaying, on the first device, a 3D mesh rendering of an extended reality environment based on a 3D mesh received from the second device for enabling the first device to render the extended reality environment, wherein the extended reality environment is simultaneously displayed on the second device;
receiving, with the first device, video of a second user and pose transforms for compositing the video of the second user in the extended reality environment displayed on the first device, wherein a view perspective of the video of the second user composited in the extended reality environment is based on the pose transforms;
responsive to predefined input to the first device, changing the view perspective of the video of the second user composited in the extended reality environment; and
conveying view perspective data from the first device to the second device as changed for causing a corresponding change in a location of the video of the first user composited in the extended reality environment simultaneously displayed on the second device;
wherein the corresponding change in the location of the video of the first user composited in the extended reality environment simultaneously displayed on the second device comprises a rotation of the first user about the second user.

10. The system of claim 9, wherein the corresponding change in view perspective of the video of the first user as composited in the extended reality environment simultaneously displayed on the second device mirrors, albeit from a perspective of the second user, the change in the view perspective of the video of the second user displayed on the first device.

11. The system of claim 9, wherein the displaying the 3D mesh rendering of the extended reality environment on the first device includes generating, by the first device, a mesh model based on the 3D mesh generated by the second device, wherein the generating the mesh model includes:
  dividing a point cloud corresponding to the extended reality environment into a plurality of non-overlapping regions;
  generating 2D image planes by projecting each non-overlapping region to a virtual camera;
  triangulating the point cloud onto a virtual image plane corresponding to the 2D image planes; and
  back-projecting each 2D image plane onto a 3D space.

12. The system of claim 9, wherein the predefined input is generated in response to a system event in which the view perspective changes to accommodate a sharing of media on the first and second devices.

13. The system of claim 9, wherein the processor is configured to initiate operations further including generating a virtual camera to capture side-by-side images of the first and second users and compositing the side-by-side images in the extended reality environment simultaneously displayed on the first and second devices.

14. The system of claim 9, wherein the processor is configured to initiate operations further including modifying the video of the first user displayed on the second device based on determining an availability of a video segmentation capability.

15. The system of claim 9, wherein the processor is configured to initiate operations further including modifying the video of the first user displayed on the second device based on determining an availability of depth-frame images.

16. The system of claim 9, wherein the 3D mesh rendering is acquired by the first device using a video camera embedded in or operatively connected with the first device.

17. A method, comprising:
  capturing, with a first device, video of a first user and conveying the video to a second device, wherein the first device lacks extended reality capabilities and the second device is extended reality capable;
  displaying, on the first device, a 3D mesh rendering of an extended reality environment based on a 3D mesh received from the second device for enabling the first device to render the extended reality environment, wherein the extended reality environment is simultaneously displayed on the second device;
  receiving, with the first device, video of a second user and pose transforms for compositing the video of the second user in the extended reality environment displayed on the first device, wherein a view perspective of the video of the second user composited in the extended reality environment is based on the pose transforms;
  responsive to predefined input to the first device, changing the view perspective of the video of the second user composited in the extended reality environment; and
  conveying view perspective data from the first device to the second device as changed for causing a corresponding change in a location of the video of the first user composited in the extended reality environment simultaneously displayed on the second device;
  wherein the displaying the 3D mesh rendering of the extended reality environment on the first device includes generating, by the first device, a mesh model based on the 3D mesh generated by the second device, wherein the generating the mesh model includes:
    dividing a point cloud corresponding to the extended reality environment into a plurality of non-overlapping regions;
    generating 2D image planes by projecting each non-overlapping region to a virtual camera;
    triangulating the point cloud onto a virtual image plane corresponding to the 2D image planes; and
    back-projecting each 2D image plane onto a 3D space.

18. The method of claim 17, wherein the corresponding change in view perspective of the video of the first user as composited in the extended reality environment simultaneously displayed on the second device mirrors, albeit from a perspective of the second user, the change in the view perspective of the video of the second user displayed on the first device.

* * * * *